(12) United States Patent
Matsuda et al.

(10) Patent No.: US 11,849,471 B2
(45) Date of Patent: Dec. 19, 2023

(54) COMMUNICATION DEVICE, COMMUNICATION METHOD, AND RECORDING MEDIUM

(71) Applicant: SONY GROUP CORPORATION, Tokyo (JP)

(72) Inventors: Hiroki Matsuda, Tokyo (JP); Ryota Kimura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 185 days.

(21) Appl. No.: 17/428,759

(22) PCT Filed: Dec. 23, 2019

(86) PCT No.: PCT/JP2019/050429
§ 371 (c)(1),
(2) Date: Aug. 5, 2021

(87) PCT Pub. No.: WO2020/166209
PCT Pub. Date: Aug. 20, 2020

(65) Prior Publication Data
US 2022/0110110 A1 Apr. 7, 2022

(30) Foreign Application Priority Data
Feb. 14, 2019 (JP) ................................. 2019-024869

(51) Int. Cl.
| | |
|---|---|
| *H04W 72/51* | (2023.01) |
| *H04L 5/00* | (2006.01) |
| *H04W 72/044* | (2023.01) |
| *H04W 72/1263* | (2023.01) |

(52) U.S. Cl.
CPC ........... *H04W 72/51* (2023.01); *H04L 5/0051* (2013.01); *H04W 72/046* (2013.01); *H04W 72/1263* (2013.01)

(58) Field of Classification Search
CPC .............. H04W 72/51; H04W 72/046; H04W 72/1263; H04L 5/0051; H04L 25/0228; H04L 5/0085
See application file for complete search history.

(56) References Cited

U.S. PATENT DOCUMENTS

| | | | |
|---|---|---|---|
| 2011/0090918 A1 | 4/2011 | Umehara et al. | |
| 2012/0281650 A1* | 11/2012 | Ouchi ............... | H04W 72/0473 370/329 |

(Continued)

FOREIGN PATENT DOCUMENTS

| | | |
|---|---|---|
| CN | 105191443 A | 12/2015 |
| CN | 109314888 A | 2/2019 |

(Continued)

OTHER PUBLICATIONS

Extended European Search Report of EP Application No. 19915361.0, dated Mar. 11, 2022, 10 pages.

(Continued)

*Primary Examiner* — Chae S Lee
(74) *Attorney, Agent, or Firm* — CHIP LAW GROUP

(57) ABSTRACT

A communication device includes a control unit that switches whether or not to transmit a first reference signal using a scheduled resource scheduled to be used to transmit a reference signal. The control unit switches between the transmission and the non-transmission of the first reference signal based on the acquired channel information, and an elapsed time from the reception of a second reference signal from a communication partner.

17 Claims, 23 Drawing Sheets

(56) References Cited

U.S. PATENT DOCUMENTS

| | | | |
|---|---|---|---|
| 2014/0126404 A1* | 5/2014 | Kim | H04W 52/243 |
| | | | 370/252 |
| 2015/0092875 A1 | 4/2015 | Kim et al. | |
| 2016/0119915 A1* | 4/2016 | Simonsson | H04W 72/542 |
| | | | 370/329 |
| 2018/0199220 A1 | 7/2018 | Reial et al. | |
| 2020/0067738 A1* | 2/2020 | Ren | H04W 72/23 |
| 2022/0353028 A1* | 11/2022 | Guan | H04L 1/0026 |

FOREIGN PATENT DOCUMENTS

| | | |
|---|---|---|
| EP | 2997777 A1 | 3/2016 |
| EP | 3466154 A1 | 4/2019 |
| EP | 3619897 A1 | 3/2020 |
| JP | 2011-087263 A | 4/2011 |
| JP | 2018-157374 A | 10/2018 |
| KR | 10-2015-0018792 A | 2/2015 |
| WO | 2013/157790 A1 | 10/2013 |
| WO | 2014/185841 A1 | 11/2014 |
| WO | 2017/211392 A1 | 12/2017 |
| WO | 2018/203201 A1 | 11/2018 |

OTHER PUBLICATIONS

International Search Report and Written Opinion of PCT Application No. PCT/JP2019/050429, dated Jan. 28, 2020, 09 pages of ISRWO.

* cited by examiner

COMMUNICATION DEVICE, COMMUNICATION METHOD, AND RECORDING MEDIUM

CROSS REFERENCE TO RELATED APPLICATIONS

This application is a U.S. National Phase of International Patent Application No. PCT/JP2019/050429 filed on Dec. 23, 2019, which claims priority benefit of Japanese Patent Application No. JP 2019-024869 filed in the Japan Patent Office on Feb. 14, 2019. Each of the above-referenced applications is hereby incorporated herein by reference in its entirety.

FIELD

The present disclosure relates to a communication device, a communication method, and a recording medium.

BACKGROUND

A radio access system and a wireless network (hereinafter, also called "Long Term Evolution (LTE)", "LTE-Advanced (LTE-A)", "LTE-Advanced Pro (LTE-A Pro)", "New Radio (NR)", "New Radio Access Technology (NRAT)", "Evolved Universal Terrestrial Radio Access (EUTRA)", or "Further EUTRA (FEUTRA)") for cellular mobile communication have been examined in the 3rd Generation Partnership Project (3GPP). Note that, in the following description, LTE includes LTE-A, LTE-A Pro, and EUTRA, and NR includes 5th generation mobile wireless communication (5G), NRAT, and FEUTRA. In LTE and NR, a base station device (base station) is also called evolved NodeB (eNodeB), and a terminal device (a mobile station, a mobile station device, and a terminal) is also called User Equipment (UE). LTE and NR are cellular communication systems in which a plurality of areas covered by base station devices are arranged in a cell shape. A single base station device may manage a plurality of cells.

NR is Radio Access Technology (RAT), which is different from LTE, as a next-generation radio access system for LTE. NR is access technology that can support various use cases including Enhanced mobile broadband (eMBB), Massive machine type communications (mMTC), and Ultra reliable and low latency communications (URLLC). NR has been examined aiming at a technical framework that corresponds to use scenarios, requirements, and arrangement scenarios in those use cases.

As one of technologies examined in NR, there is transmission equalization technology. Typical equalization technology enables a reception terminal to perform reception equalization by adding a reference signal for channel estimation to a data signal and transmitting the data signal. On the other hand, transmission equalization is technology that eliminates the need for the reception equalization by performing transmission equalization processing for compensating for variations in amplitude and/or phase received from a communication channel in advance in transmission processing. Details of the technology for the transmission equalization are disclosed in, for example, the following Patent Literature 1.

CITATION LIST

Patent Literature

Patent Literature 1: JP 2018-157374 A

SUMMARY

Technical Problem

However, the technology proposed in the above Patent Literature 1 has been just developed, and it is hard to say that the technology sufficiently satisfies the improvement of transmission efficiency of the entire system required in NR.

Accordingly, the present disclosure proposes a mechanism capable of further improving transmission efficiency of an entire system.

Solution to Problem

According to the present disclosure, a communication device is provided that includes: a control unit that switches whether or not to transmit a first reference signal using a scheduled resource scheduled to be used to transmit a reference signal.

Moreover, according to the present disclosure, a communication device is provided that includes: a control unit that performs reception processing according to whether or not a first reference signal has been transmitted using a scheduled resource scheduled to be used to transmit a reference signal.

Moreover, according to the present disclosure, a communication method is provided that includes: switching, by a processor, whether or not to transmit a first reference signal using a scheduled resource scheduled to be used to transmit a reference signal.

Moreover, according to the present disclosure, a communication method is provided that includes: performing, by a processor, reception processing according to whether or not a first reference signal has been transmitted using a scheduled resource scheduled to be used to transmit a reference signal.

Moreover, according to the present disclosure, a recording medium is provided that includes a program, the program causing a computer to function as: a control unit that switches whether or not to transmit a first reference signal using a scheduled resource scheduled to be used to transmit a reference signal.

Moreover, according to the present disclosure, a recording medium is provided that includes a program, the program causing a computer to function as: a control unit that performs reception processing according to whether or not a first reference signal has been transmitted using a scheduled resource scheduled to be used to transmit a reference signal.

DESCRIPTION OF EMBODIMENTS

Figure 1:
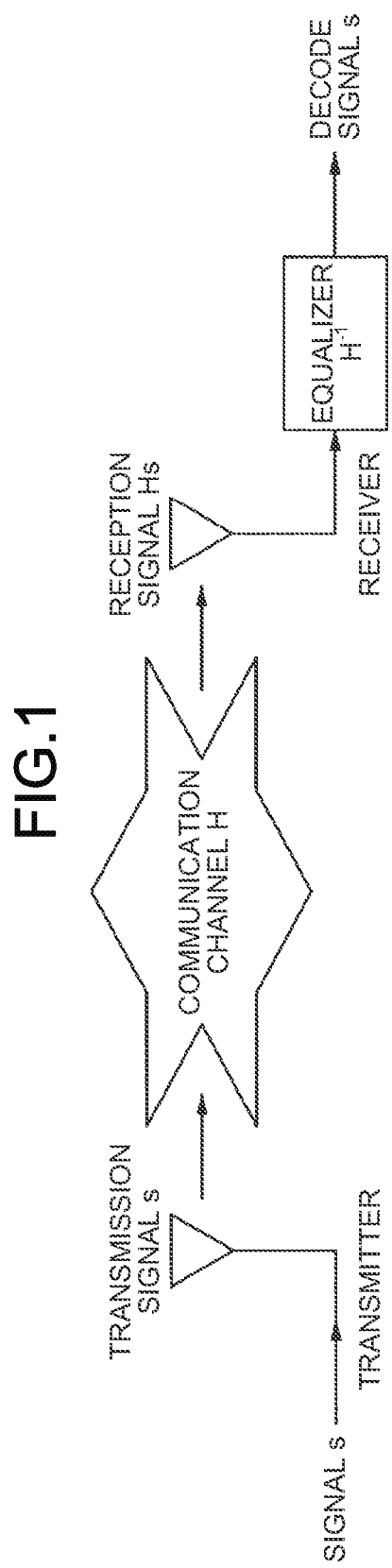
FIG. 1 is a diagram for explaining reception equalization.

Hereinafter, preferred embodiments of the present disclosure will be described in detail with reference to the accompanying drawings. Note that, in the present specification and the drawings, redundant description of components having substantially the same functional configuration is omitted by assigning the same reference numerals.

Note that the description will be given in the following order.
1. Introduction
  1.1. Reception Equalization and Transmission Equalization
  1.2. Outline of Proposed Technology
2. Configuration Example
  2.1. Configuration Example of Entire System
  2.2. Configuration Example of First Communication Device
  2.3. Configuration Example of Second Communication Device
  2.4. Configuration Example of Communication Control Device
3. Technical Features
  3.1. Switching of Transmission/Non-Transmission of Reference Signal
  3.2. Notification of Setting Information
  3.3. Switching Based on Condition Determination
4. Application Example
5. Conclusion <<1. Introduction>>
<1.1. Reception Equalization and Transmission Equalization>

Equalization is to multiply a signal whose amplitude and/or phase is changed by a communication channel, for example, by an inverse matrix of the channel and return the signal to an original signal. Hereinafter, reception equalization and transmission equalization will be described with reference to FIGS. 1 and 2.

FIG. 1 is a diagram for explaining the reception equalization. As illustrated in FIG. 1, when a transmitter transmits a transmission signal s, and the transmission signal propagates through a communication channel H and is received by a receiver, the reception signal becomes Hs. In a case of the reception equalization in which the equalization is performed by the receiver, the receiver estimates an inverse matrix $H^{-1}$ of the communication channel H, multiplies the reception signal Hs by the inverse matrix $H^{-1}$, and decodes the transmission signal s.

Figure 2:
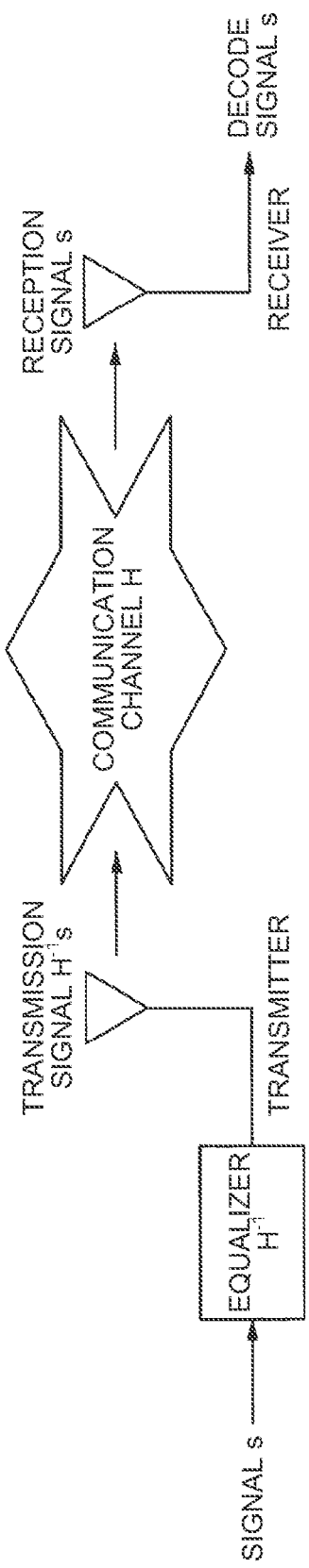
FIG. 2 is a diagram for explaining transmission equalization.

FIG. 2 is a diagram for explaining the transmission equalization. As illustrated in FIG. 2, the transmitter transmits a transmission signal $H^{-1}$s obtained by multiplying the signal s by the inverse matrix $H^{-1}$ of the communication channel H estimated in advance. When the transmission signal $H^{-1}$s propagates through the communication channel H and is received by the receiver, the reception signal becomes s. As described above, the equalization is performed on the transmitter side in advance, so that it is possible to decode the signal s without performing the equalization on the receiver side.

<1.2. Outline of Proposed Technology>

A reference signal is used in the estimation of the communication channel performed in the equalization. The communication channel is estimated on the basis of a reception result of the reference signal, and the equalization is performed on the basis of the estimated communication channel.

Here, if the transmission equalization is performed, it is considered that it is unnecessary to transmit the reference signal from the transmitter to the receiver because the reception side does not need to perform the reception equalization. Further, if there is a small change in the channel after performing the channel estimation based on the reference signal on the reception side even though the transmission equalization is not performed, the reception equalization may be performed by diverting a past channel estimation result. Even in that case, it is considered that it is unnecessary to transmit the reference signal again and estimate the channel again. In addition, it is considered that there are cases where the transmission of the reference signal can be omitted.

Therefore, the present disclosure proposes a mechanism capable of switching transmission/non-transmission of the reference signal. As a result, the transmission of the reference signal is omitted when the reference signal is not always necessary to decode the transmission signal, so that transmission efficiency of an entire system can be improved.

<<2. Configuration Example>>

<2.1. Configuration Example of Entire System>

Figure 3:
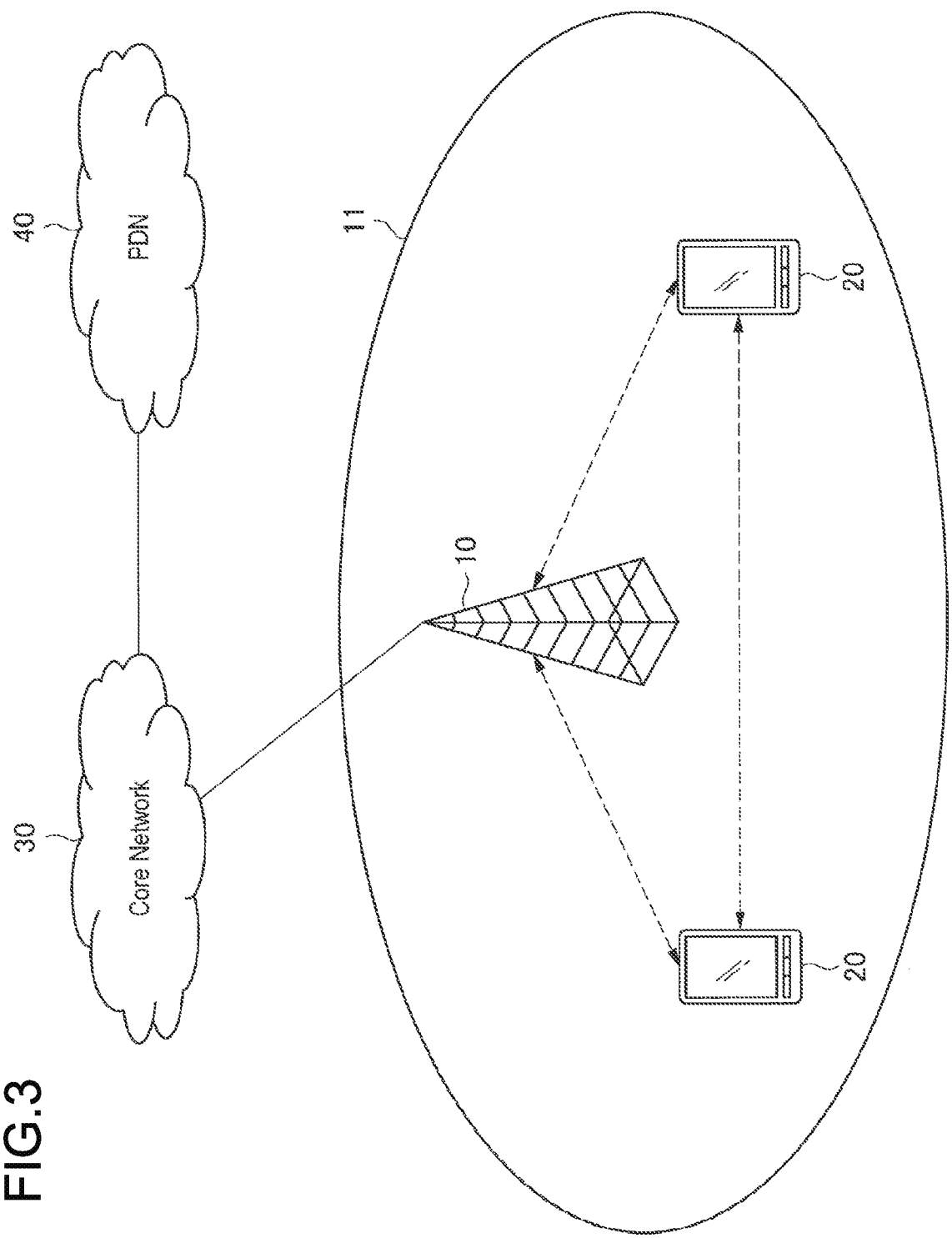
FIG. 3 is a diagram illustrating an overall configuration of a communication system according to an embodiment of the present disclosure.

FIG. 3 is a diagram illustrating an overall configuration of a communication system according to an embodiment of the present disclosure. As illustrated in FIG. 3, a communication system 1 includes a base station 10, a plurality of terminal devices 20, a core network 30, and a packet data network (PDN) 40.

The base station 10 is a communication device that operates a cell 11 and provides wireless communication services to one or more terminal devices 20 located inside the cell 11. The cell 11 is operated according to any wireless communication system such as LTE or NR. The base station 10 is connected to the core network 30. The core network 30 is connected to the packet data network (PDN) 13 via a gateway device (not illustrated).

The core network 30 can include a mobility management entity (MME), a serving gateway (S-GW), a PDN gateway (P-GW), a policy and charging rule function (PCRF), and a home subscriber server (HSS). Alternatively, the core network 30 can include entities of NR having similar functions. The MME is a control node that handles signals of a control plane, and manages a movement state of the terminal device. The S-GW is a control node that handles signals of a user plane, and is a gateway device that switches a transfer path of user data. The P-GW is a control node that handles signals of the user plane, and is a gateway device that functions as a connection point between the core network 30 and the PDN 40. The PCRF is a control node that controls policies such as Quality of Service (QoS) for bearers and billing. The HSS is a control node that handles subscriber data and controls services.

The terminal device 20 is a communication device that performs wireless communication on the basis of the control of the base station 10. The terminal device 20 can perform wireless communication with the base station 10. A communication link in a direction from the base station 10 to the terminal device 20 is also called a downlink, and the terminal device 20 receives a downlink signal from the base station 10. A communication link in a direction from the terminal device 20 to the base station 10 is also called an uplink, and the terminal device 20 transmits an uplink signal to the base station 10. Further, the terminal device 20 can perform wireless communication with another terminal device 20. A communication link between the terminal devices 20 is also called a sidelink, and the terminal device 20 transmits and receives a sidelink signal to and from another terminal device 20.

Here, each device included in the communication system 1 can function as a first communication device 100, a second communication device 200, or a communication control device 300, which will be described in detail later with reference to FIGS. 4 to 6.

The first communication device 100 is a communication device that switches whether or not to transmit a reference signal and transmits the reference signal according to a switching result. Hereinafter, the reference signal transmitted by the first communication device 100 may also be called a first reference signal. The second communication device 200 is a communication device that receives the first reference signal transmitted from the first communication device 100. However, the second communication device 200 can also transmit the reference signal. Hereinafter, the reference signal transmitted by the second communication device 200 may also be called a second reference signal. The second reference signal can be used to determine switching of transmission/non-transmission of the first reference signal. The communication control device 300 is a device that performs setting related to switching of transmission/non-transmission of the reference signal by the first communication device 100.

In uplink communication and downlink communication, one of the base station 10 and the terminal device 20 functions as the first communication device 100, and the other functions as the second communication device 200. The device that functions as the communication control device 300 in the uplink communication and the downlink communication is typically the base station 10. In addition, for example, any entity within the core network 30 may function as the communication control device 300.

In sidelink communication, one of the terminal devices 20 that perform the sidelink communication functions as the first communication device 100, and the other functions as the second communication device 200. The device that functions as the communication control device 300 in the sidelink communication is typically the base station 10 or the terminal device 20. In addition, for example, any entity within the core network 30 may function as the communication control device 300.

Note that the device that functions as the first communication device 100 and the device that functions as the second communication device 200 can be appropriately switched. For example, at a first time, the base station 10 may function as the first communication device 100, and the terminal device 20 may function as the second communication device 200. Then, at a second time, the terminal device 20 may function as the first communication device 100, and the base station 10 may function as the second communication device 200.

<2.2. Configuration Example of First Communication Device>

Figure 4:
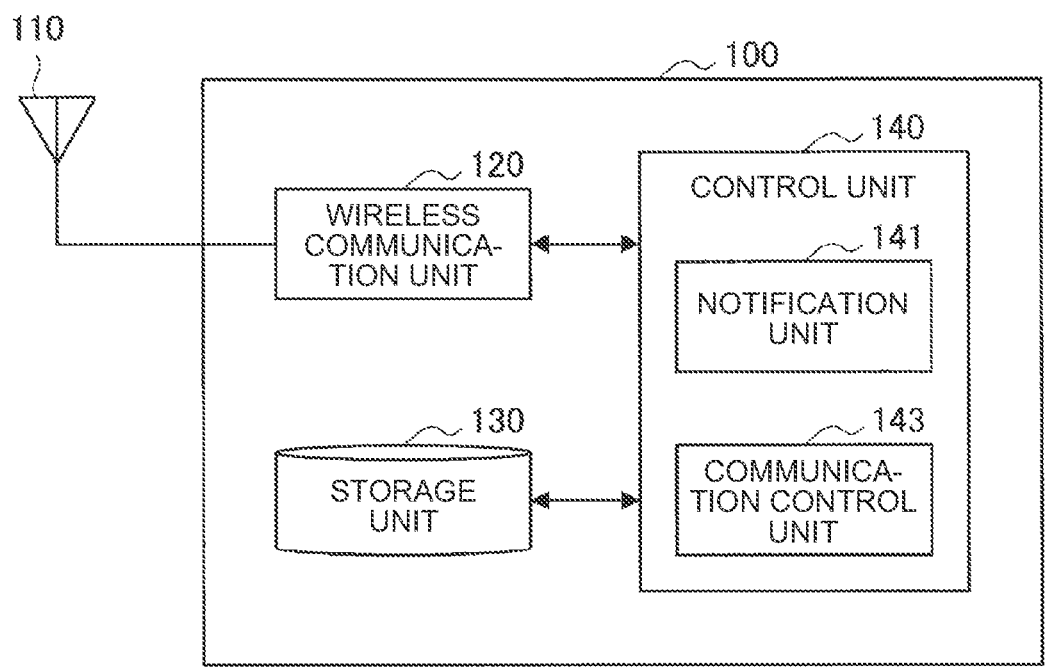
FIG. 4 is a block diagram illustrating an example of a configuration of a first communication device according to the present embodiment.

FIG. 4 is a block diagram illustrating an example of a configuration of the first communication device 100 according to the present embodiment. Referring to FIG. 4, the first communication device 100 includes an antenna unit 110, a wireless communication unit 120, a storage unit 130, and a control unit 140.

(1) Antenna Unit 110

The antenna unit 110 radiates a signal output by the wireless communication unit 120 into a space as a radio wave. Further, the antenna unit 110 converts the radio wave in the space into a signal and outputs the signal to the wireless communication unit 120.

(2) Wireless Communication Unit 120

The wireless communication unit 120 transmits and receives a signal. For example, the wireless communication unit 120 transmits a signal to the second communication device 200 and receives a signal from the second communication device 200.

(3) Storage Unit 130

The storage unit 130 temporarily or permanently stores programs and a variety of data for the operation of the first communication device 100.

(4) Control Unit 140

The control unit 140 controls the operation of the entire first communication device 100 and provides various functions of the first communication device 100. The control unit 140 includes a notification unit 141 and a communication control unit 143. The notification unit 141 has a function of notifying the communication control device 300 of information regarding switching of transmission/non-transmission of the reference signal of the first communication device 100. The communication control unit 143 has a function of controlling communication processing by the first communication device 100. In particular, the communication control unit 143 switches transmission/non-transmission of the reference signal according to the control by the communication control device 300. Note that the control unit 140 can also include components other than these components. That is, the control unit 140 can also exhibit functions other than the functions of these components.

(5) Supplement

The first communication device 100 can further include a network communication unit for communicating with the communication control device 300. For example, when the base station 10 functions as the first communication device 100 and the communication control device 300, the network communication unit performs communication within the base station 10. As another example, when the base station 10 functions as the communication control device 300 and the terminal device 20 functions as the first communication device 100, a function as the network communication unit is realized by the wireless communication unit 120.

<2.3. Configuration Example of Second Communication Device>

Figure 5:
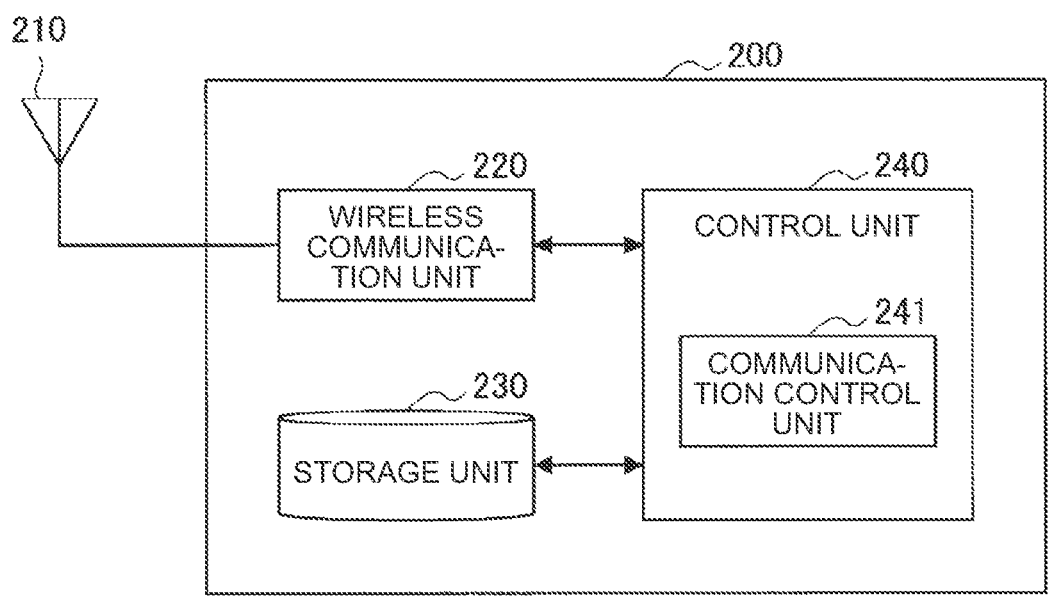
FIG. 5 is a block diagram illustrating an example of a configuration of a second communication device according to the present embodiment.

FIG. 5 is a block diagram illustrating an example of a configuration of the second communication device 200 according to the present embodiment. Referring to FIG. 5, the second communication device 200 includes an antenna unit 210, a wireless communication unit 220, a storage unit 230, and a control unit 240.

(1) Antenna Unit 210

The antenna unit 210 radiates a signal output by the wireless communication unit 220 into a space as a radio wave. Further, the antenna unit 210 converts the radio wave in the space into a signal and outputs the signal to the wireless communication unit 220.

(2) Wireless Communication Unit 220

The wireless communication unit 220 transmits and receives a signal. For example, the wireless communication unit 220 transmits a signal to the first communication device 100 and receives a signal from the first communication device 100.

(3) Storage Unit 230

The storage unit 230 temporarily or permanently stores programs and a variety of data for the operation of the second communication device 200.

(4) Control Unit 240

The control unit 240 controls the operation of the entire second communication device 200 and provides various functions of the second communication device 200. The control unit 240 includes a communication control unit 241. The communication control unit 241 has a function of controlling communication processing by the second communication device 200. In particular, the communication control unit 241 performs reception processing according to switching of transmission/non-transmission of the reference signal by the first communication device 100. Note that the control unit 240 can also include components other than these components. That is, the control unit 240 can also exhibit functions other than the functions of these components.

<2.4. Configuration Example of Communication Control Device>

Figure 6:
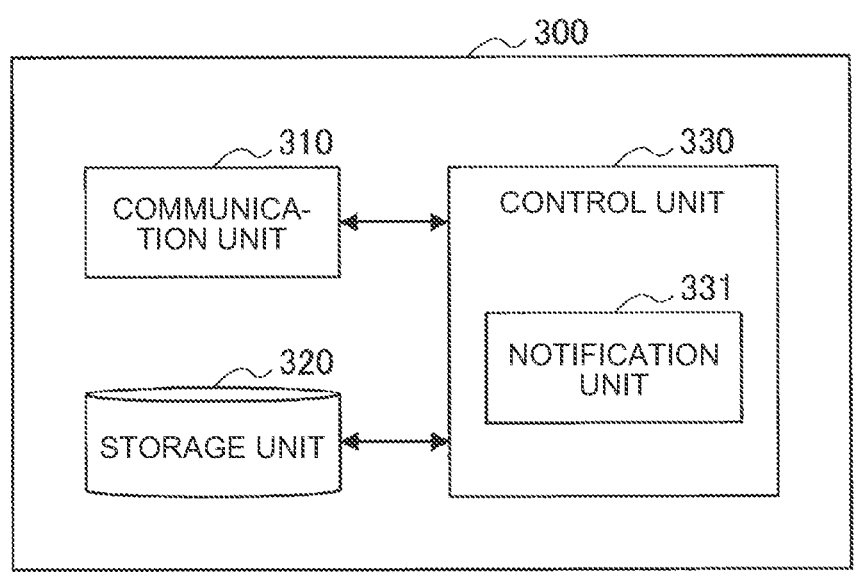
FIG. 6 is a block diagram illustrating an example of a configuration of a communication control device according to the present embodiment.

FIG. 6 is a block diagram illustrating an example of a configuration of the communication control device 300 according to the present embodiment. Referring to FIG. 6, the communication control device 300 includes a communication unit 310, a storage unit 320, and a control unit 330.

(1) Communication Unit 310

The communication unit 310 transmits and receives a signal. For example, the communication unit 310 transmits a signal to the first communication device 100 and receives a signal from the first communication device 100.

(2) Storage Unit 320

The storage unit 320 temporarily or permanently stores programs and a variety of data for the operation of the communication control device 300.

(3) Control Unit 330

The control unit 330 controls an operation of the entire communication control device 300 and provides various functions of the communication control device 300. The control unit 330 includes a notification unit 331. The notification unit 331 has a function of notifying the first communication device 100 under control of a variety of information. In particular, the notification unit 331 notifies the first communication device 100 of setting information regarding switching of transmission/non-transmission of the reference signal. Note that the control unit 330 can also include components other than these components. That is, the control unit 330 can also exhibit functions other than the functions of these components.

<<3. Technical Features>>

<3.1. Switching of Transmission/Non-Transmission of Reference Signal>

(1) Processing by First Communication Device 100

The first communication device 100 (for example, the notification unit 141) transmits capability information regarding switching whether or not to transmit the first reference signal using a scheduled resource scheduled to be used to transmit the reference signal to the communication control device 300. The capability information includes at least information indicating whether or not the first communication device 100 can switch transmission/non-transmission of the first reference signal. Further, the capability information can include type information of a channel where the first communication device 100 can switch transmission/non-transmission of the first reference signal and identification information of the scheduled resource.

The scheduled resource is a resource secured in advance for transmitting the reference signal. For example, as the scheduled resource, a plurality of resource elements are secured in a unit resource including a predetermined frequency resource (for example, a resource block) and a predetermined time resource (for example, a slot or a subframe).

The first communication device 100 (for example, the communication control unit 143) switches whether or not to transmit the first reference signal using the scheduled resource scheduled to be used to transmit the first reference signal. That is, the first communication device 100 switches between transmitting a signal including the first reference signal in the scheduled resource and transmitting a signal not including the first reference signal in the scheduled resource. The switching of transmission/non-transmission of the first reference signal may be performed for a plurality of scheduled resources (for example, for each unit resource). For example, the first communication device 100 may switch between transmitting the first reference signal in all scheduled resources included in the unit resource and not transmitting the first reference signal in at least a part of the scheduled resources included in the unit resource. When the first communication device 100 communicates with the plurality of second communication devices 200, the switching may be performed for each of the second communication devices 200.

The first communication device 100 measures the second reference signal transmitted from the second communication device 200, estimates a communication channel between the first communication device 100 and the second communication device 200, and acquires channel information. The first communication device 100 performs the reception equalization on the basis of the acquired channel information. Further, the first communication device 100 can perform the transmission equalization on the basis of the acquired channel information.

Typically, the first communication device 100 performs the transmission equalization in a case of not transmitting the first reference signal in the scheduled resource. For the transmission equalization, the channel information acquired on the basis of the second reference signal transmitted from the second communication device 200 is used. When the transmission equalization is performed, the second communication device 200 can decode the transmission signal without performing the reception equalization. The first communication device 100 may not perform the transmission equalization even in a case of not transmitting the first reference signal in the scheduled resource. In that case, in the second communication device 200, the reception equalization is performed on the basis of the channel information obtained from the first reference signal previously transmitted from the first communication device 100.

The first communication device 100 may perform zero power transmission in a scheduled resource in which the first reference signal is not transmitted. In this case, it is possible to suppress a power consumption amount. Further, the first communication device 100 may use the scheduled resource in which the first reference signal is not transmitted as another transmission channel. In this case, it is possible to improve frequency efficiency.

(2) Processing by Second Communication Device 200

The second communication device 200 (for example, the communication control unit 241) transmits the second reference signal using the scheduled resource scheduled to be used to transmit the reference signal. That is, the second communication device 200 transmits a signal including the second reference signal in the scheduled resource. As a result, the first communication device 100 can acquire channel information.

The second communication device 200 (for example, the communication control unit 241) performs reception processing according to whether or not the first reference signal has been transmitted in the scheduled resource. For example, the second communication device 200 determines whether or not the first reference signal has been transmitted in the scheduled resource. When the first reference signal is transmitted in the scheduled resource, the second communication device 200 performs the reception equalization on the basis of the channel information obtained from the first reference signal. On the other hand, when it is determined that the first reference signal is not transmitted in the scheduled resource, the second communication device 200 determines whether or not the transmission equalization is completed. Then, when the transmission equalization is completed, the second communication device 200 simply treats the received signal as a decoded transmission signal. On the other hand, when the transmission equalization is not completed, the reception equalization is performed on the basis of the channel information obtained from the first reference signal transmitted previously.

When the reception equalization is performed, the second communication device 200 selects which first reference signal is used for the reception equalization. Typically, the second communication device 200 uses the first reference signal received more recently. This is because it is assumed that the channel change is smaller than others.

The second communication device 200 acquires information for reception processing from the first communication device 100 or the communication control device 300. The information for the reception processing may be, for example, information indicating whether or not the first reference signal has been transmitted in the scheduled resource, and information indicating whether or not the transmission equalization is performed when the first reference signal is not transmitted in the scheduled resource. In addition, the information for the reception processing may be, for example, information for determining whether or not the first reference signal has been transmitted in the scheduled resource, and information for determining whether or not the transmission equalization is performed when the first reference signal is not transmitted in the scheduled resource. Specifically, the information for the reception processing may be setting information described later. The setting information can be notified directly from the communication control device 300 or indirectly via the first communication device 100.

(3) Example of Scheduled Resource

The transmission of the first reference signal using the scheduled resource is not performed in communication in a first direction, and the transmission of the second reference signal using the scheduled resource may be performed in communication in a second direction facing the first direction. The first direction and the second direction are a downlink and an uplink, an uplink and a downlink, or a sidelink and a sidelink, respectively. For example, the second reference signal may be transmitted on the downlink, and transmission/non-transmission of the first reference signal may be switched on the uplink. As another example, the second reference signal may be transmitted on the uplink, and the transmission/non-transmission of the first reference signal may be switched on the downlink. As another example, the second reference signal may be transmitted in the first direction of the sidelink, and the transmission/non-transmission of the first reference signal may be switched in the second direction of the sidelink. Note that scheduled resources of the downlink, the uplink, or the sidelink can be determined by a TDD configuration or a slot format indicator.

The transmission of the reference signal using the scheduled resource in resources for a first use is not performed, and the transmission of the reference signal using the scheduled resource in resources for a second use different from the first use may be performed. The resources for the first use and the resources for the second use are resources for control and resources for data, or resources for data and resources for control, respectively. For example, the second reference signal may be transmitted in the resource for the control, and transmission/non-transmission of the first reference signal may be switched in the resource for the data. As another example, the second reference signal may be transmitted in the resource for the data, and transmission/non-transmission of the first reference signal may be switched in the resource for the control. As a specific example, the second communication device 200 transmits a data signal including the second reference signal using the resource for the data, and the first communication device 100 switches whether or not to include the first reference signal in a reception response (ACK/NACK) to the data signal. Examples of the resource for the control include a physical downlink control channel (PDCCH), a physical uplink control channel (PUCCH), and a physical sidelink control channel (PSCCH). Examples of the resource for the data include a physical downlink shared channel (PDSCH), a physical uplink shared channel (PUSCH), and a physical sidelink shared channel (PSSCH).

Example of Reference Signal

The reference signal is a demodulation reference signal (DM-RS), a phase-tracking reference signal (PT-RS), a sounding reference signal (SRS), or a channel state information reference signal (CSI-RS).

<3.2. Notification of Setting Information>

The communication control device 300 notifies the first communication device 100 of setting information for controlling whether or not to transmit the first reference signal using the scheduled resource in the first communication device 100. The communication control device 300 generates the setting information by referring to the capability information of the first communication device 100.

For notification of the setting information, for example, system information, RRC signaling, MAC control element (CE), or downlink control information (DCI) can be used.

(1) Setting Information Including Explicit Switching Instruction

The setting information may include an explicit switching instruction as to whether or not the first communication device 100 transmits the first reference signal using the scheduled resource. In that case, the first communication device 100 switches transmission/non-transmission of the first reference signal according to the explicit switching instruction in the setting information. The setting information regarding the explicit switching instruction will be described below.

The setting information can include information indicating whether or not to transmit the first reference signal using the scheduled resource. The first communication device 100 switches transmission/non-transmission of the first reference signal as instructed.

The setting information can include information indicating types of channels instructed not to be used to transmit the first reference signal. The first communication device 100 does not transmit the first reference signal using the scheduled resource in the instructed types of channels. For example, PDSCH, PDCCH, PUSCH, PUCCH, PSSCH, and PSCCH can be instructed not to be used to transmit the first reference signal.

The setting information can include identification information of the scheduled resource instructed not to be used to transmit the first reference signal. The first communication device 100 does not transmit the first reference signal in the instructed scheduled resource. For example, the identification information may be a subcarrier index, a symbol index, or a slot index.

(2) Setting Information Including Implied Switching Instruction

The setting information may include an implied switching instruction as to whether or not the first communication device 100 transmits the first reference signal using the scheduled resource. In that case, the first communication device 100 switches transmission/non-transmission of the first reference signal on the basis of the implied instruction in the setting information. The setting information regarding the implied switching instruction will be described below.

The setting information can include information indicating a criterion for switching whether or not to transmit the first reference signal using the scheduled resource. The first communication device 100 performs condition determination on the basis of the notified setting information and switches transmission/non-transmission of the first reference signal according to a determination result. The information notified as the setting information and the details of the switching based on the condition determination will be described in detail in a next section.

<3.3. Switching Based on Condition Determination>

The first communication device 100 switches whether or not to transmit the first reference signal using the scheduled resource, on the basis of the setting information including the implied switching instruction notified from the communication control device 300.

In particular, the first communication device 100 (for example, the communication control unit 143) switches whether or not to transmit the first reference signal using the scheduled resource, on the basis of the channel information acquired in advance. Here, the channel information is information indicating characteristics of the communication channel between the first communication device 100 and the second communication device 200. For example, the first communication device 100 does not transmit the first reference signal when the channel information is acquired in advance and transmission equalization based on the channel information is possible, and transmits the first reference signal otherwise. As another example, the first communication device 100 does not transmit the first reference signal when the channel information is acquired in advance by the second communication device 200 and reception equalization based on the channel information is possible, and transmits the first reference signal otherwise. In any case, the second communication device 200 can obtain an equalized transmission signal.

An example of the switching criterion will be described below. Note that a plurality of switching criteria may be used in combination.

(1) Switching Based on Elapsed Time from Receiving Second Reference Signal

The first communication device 100 may switch whether or not to transmit the first reference signal using the scheduled resource, on the basis of an elapsed time from receiving the second reference signal from the second communication device 200 to be a communication partner. Specifically, the first communication device 100 acquires channel information in advance on the basis of the second reference signal. Then, the first communication device 100 transmits a transmission equalization completed signal without including the first reference signal until the elapsed time exceeds a predetermined threshold value. In this case, the first communication device 100 may perform transmission equalization using the channel information acquired in advance. When an elapsed time from the channel estimation based on the second reference signal is short, it is assumed that there is a small change in the channel, so that it is possible to perform the transmission equalization by diverting the channel information acquired in advance. On the other hand, when the elapsed time exceeds the predetermined threshold value, the first communication device 100 transmits a signal including the first reference signal.

As an example, on the basis of an elapsed time until the reception response (ACK/NACK) of the signal including the second reference signal is transmitted, the first communication device 100 may switch whether or not to include the first reference signal in the reception response. Specifically, the first communication device 100 acquires channel information on the basis of the second reference signal. Then, the first communication device 100 performs transmission equalization of the reception response using the channel information acquired in advance until the elapsed time exceeds a predetermined threshold value, and transmits a transmission equalization completed reception response without including the first reference signal. On the other hand, when the elapsed time exceeds the predetermined threshold value, the first communication device 100 transmits the reception response including the first reference signal. The predetermined threshold value may be, for example, an N slot, an M symbol, or a reception response in the same slot as the received signal.

As the setting information, for example, a predetermined threshold value related to the elapsed time until the reception response can be notified.

An example of a flow of switching processing based on the reception response time will be described with reference to FIGS. 7 and 8.

Figure 7:
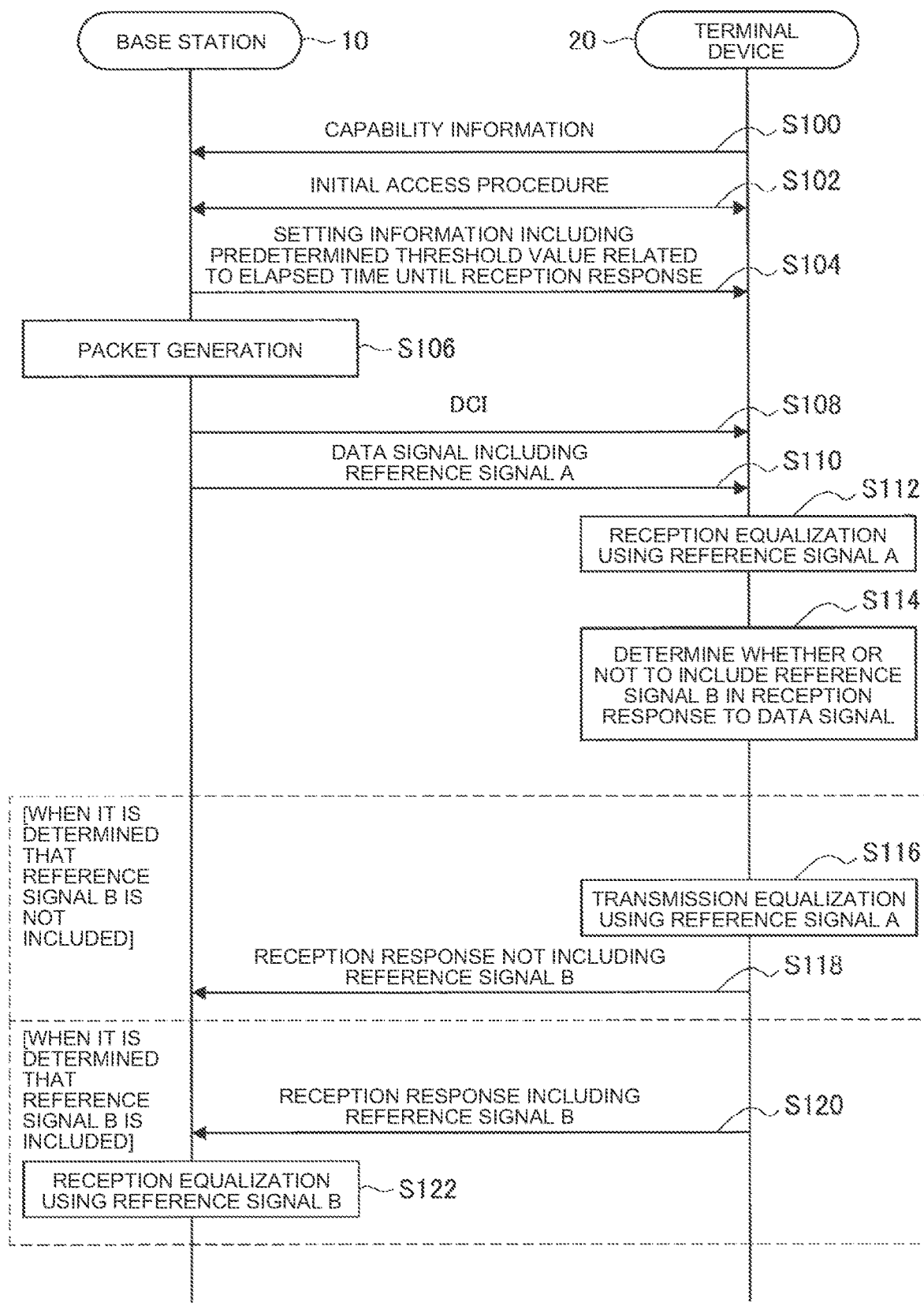
FIG. 7 is a sequence diagram illustrating an example of a flow of switching processing of transmission/non-transmission of a first reference signal executed in the communication system according to the present embodiment.

FIG. 7 is a sequence diagram illustrating an example of a flow of switching processing of transmission/non-transmission of the first reference signal executed in the communication system 1 according to the present embodiment. In the present sequence, the base station 10 and the terminal device 20 are involved. In the present sequence, the base station 10 functions as the second communication device 200 and the communication control device 300, and the terminal device 20 functions as the first communication device 100.

As illustrated in FIG. 7, first, the terminal device 20 transmits capability information to the base station 10 (step S100). Next, the base station 10 and the terminal device 20 execute an initial access procedure (step S102). Next, the base station 10 notifies the terminal device 20 of setting information including a predetermined threshold value related to an elapsed time until a reception response (step S104). Next, when a packet is generated in the base station 10 (step S106), the base station 10 notifies the terminal device 20 of DCI (step S108). Note that the above setting information may be included in the DCI and notified. Next, the base station 10 transmits a data signal including a reference signal A to the terminal device 20 (step S110). Next, the terminal device 20 performs reception equalization using the reference signal A and decodes the data signal (step S112).

After that, the terminal device 20 determines whether or not to include a reference signal B in the reception response to the data signal (step S114). The determination is performed on the basis of whether or not an elapsed time from the reception of the data signal to the transmission of the reception response exceeds the predetermined threshold value notified in the setting information. When it is determined that the reference signal B is not included (step S114/NO), the terminal device 20 performs transmission equalization using the reference signal A (step S116), and transmits a transmission equalized reception response that does not include the reference signal B (step S118). On the other hand, when it is determined that the reference signal B is included (step S114/YES), the terminal device 20 transmits a reception response including the reference signal B (step S120). Then, the base station 10 performs reception equalization using the reference signal B and decodes the reception response (step S122).

Figure 8:
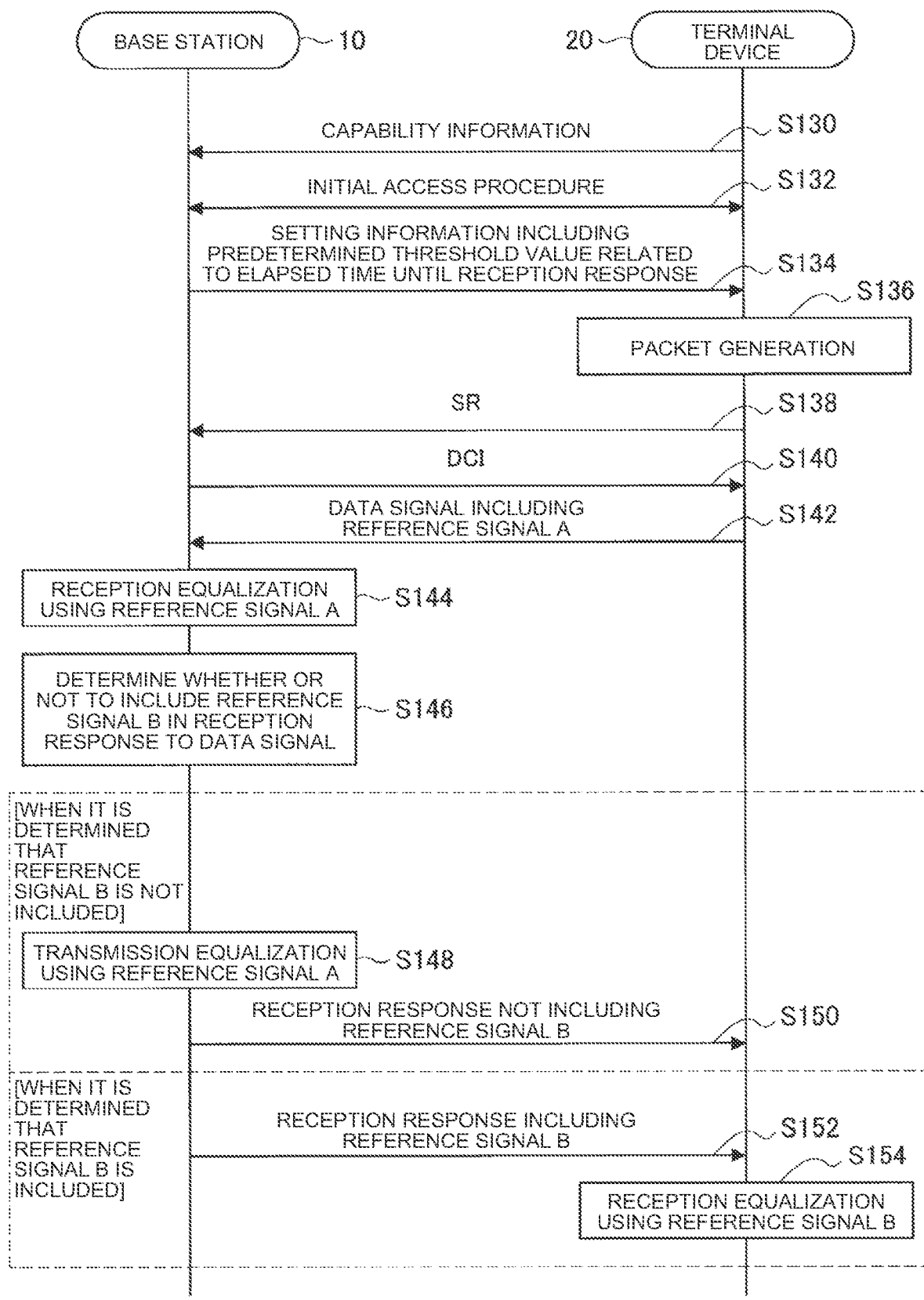
FIG. 8 is a sequence diagram illustrating an example of a flow of switching processing of transmission/non-transmission of a first reference signal executed in the communication system according to the present embodiment.

FIG. 8 is a sequence diagram illustrating an example of a flow of switching processing of transmission/non-transmission of the first reference signal executed in the communication system 1 according to the present embodiment. In the present sequence, the base station 10 and the terminal device 20 are involved. In the present sequence, the base station 10 functions as the first communication device 100 and the communication control device 300, and the terminal device 20 functions as the second communication device 200.

As illustrated in FIG. 8, first, the terminal device 20 transmits capability information to the base station 10 (step S130). Next, the base station 10 and the terminal device 20 execute an initial access procedure (step S132). Next, the base station 10 notifies the terminal device 20 of setting information including a predetermined threshold value related to an elapsed time until a reception response (step S134). Next, when a packet is generated in the terminal device 20 (step S136), the terminal device 20 notifies the base station 10 of a scheduling request (SR) (step S138). Next, the base station 10 performs scheduling and notifies the terminal device 20 of DCI (step S140). Next, the terminal device 20 transmits a data signal including the reference signal A to the base station 10 (step S142). Next, the base station 10 performs reception equalization using the reference signal A and decodes the data signal (step S144).

After that, the base station 10 determines whether or not to include the reference signal B in the reception response to the data signal (step S146). The determination is performed on the basis of whether or not an elapsed time from the reception of the data signal to the transmission of the reception response exceeds the predetermined threshold value notified in the setting information. When it is determined that the reference signal B is not included (step S146/NO), the base station 10 performs transmission equalization using the reference signal A (step S148), and transmits a transmission equalized reception response that does not include the reference signal B (step S150). On the other hand, when it is determined that the reference signal B is included (step S146/YES), the base station 10 transmits a reception response including the reference signal B (step S152). Then, the terminal device 20 performs reception equalization using the reference signal B and decodes the reception response (step S154).

Note that, in steps S150 and S152, DCI for retransmission may be transmitted instead of the reception response (ACK/NACK).

(2) Switching Based on Number of Symbols Included in Slot

The first communication device 100 may switch whether or not to transmit the first reference signal using the scheduled resource, on the basis of the number of symbols included in the slot. For example, when the number of symbols included in one slot is larger than a predetermined threshold value, the first communication device 100 transmits the first reference signal using the scheduled resource. On the other hand, when the number of symbols included in one slot is small, the first communication device 100 does not transmit the first reference signal using the scheduled resource. In this case, the first communication device 100 may perform transmission equalization using the channel information acquired in advance. When the number of symbols per slot is small, it is assumed that an elapsed time from the channel estimation based on the second reference signal to the transmission of the response is short. Therefore, since it is assumed that there is a small change in the channel, it is possible to perform the transmission equalization by diverting the channel information acquired in advance.

As the setting information, for example, the number of symbols included in the slot can be notified. As another example, as the setting information, a predetermined threshold value related to the number of symbols included in the slot can be notified.

An example of a flow of switching processing based on the number of symbols included in the slot will be described with reference to FIGS. 9 and 10.

Figure 9:
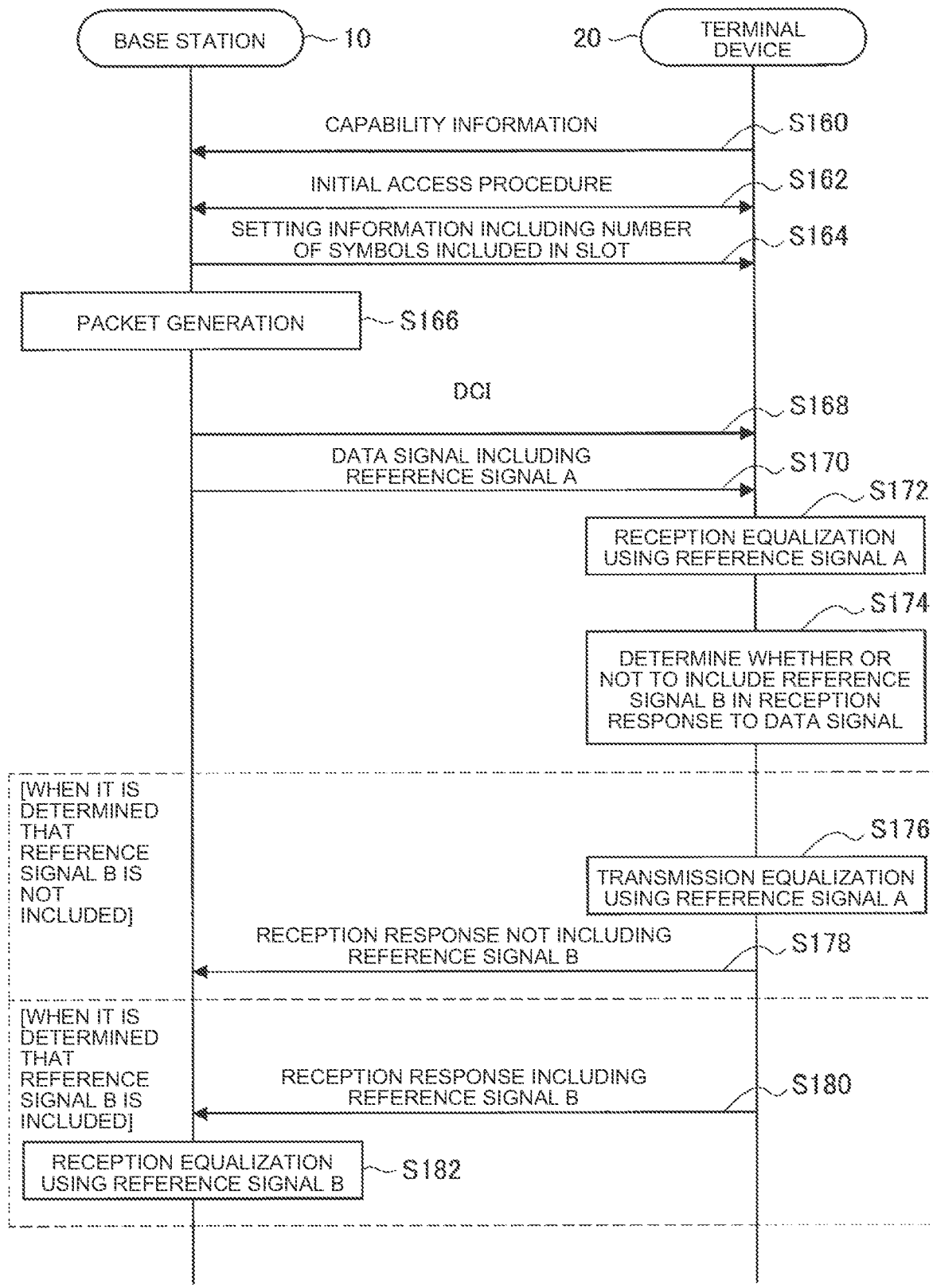
FIG. 9 is a sequence diagram illustrating an example of a flow of switching processing of transmission/non-transmission of a first reference signal executed in the communication system according to the present embodiment.

FIG. 9 is a sequence diagram illustrating an example of a flow of switching processing of transmission/non-transmission of the first reference signal executed in the communication system 1 according to the present embodiment. In the present sequence, the base station 10 and the terminal device 20 are involved. In the present sequence, the base station 10 functions as the second communication device 200 and the communication control device 300, and the terminal device 20 functions as the first communication device 100.

As illustrated in FIG. 9, first, the terminal device 20 transmits capability information to the base station 10 (step S160). Next, the base station 10 and the terminal device 20 execute an initial access procedure (step S162). Next, the base station 10 notifies the terminal device 20 of the setting information including the number of symbols included in the slot (step S164). Next, when a packet is generated in the base station 10 (step S166), the base station 10 notifies the terminal device 20 of DCI (step S168). Note that the above setting information may be included in the DCI and notified. Next, the base station 10 transmits a data signal including the reference signal A to the terminal device 20 (step S170). Next, the terminal device 20 performs reception equalization using the reference signal A and decodes the data signal (step S172).

After that, the terminal device 20 determines whether or not to include the reference signal B in the reception response to the data signal (step S174). The determination is performed on the basis of whether or not the number of symbols included in the slot notified in the setting information exceeds a predetermined threshold value. When it is determined that the reference signal B is not included (step S174/NO), the terminal device 20 performs transmission equalization using the reference signal A (step S176), and transmits a transmission equalized reception response that does not include the reference signal B (step S178). On the other hand, when it is determined that the reference signal B is included (step S174/YES), the terminal device 20 transmits a reception response including the reference signal B (step S180). Then, the base station 10 performs reception equalization using the reference signal B and decodes the reception response (step S182).

Figure 10:
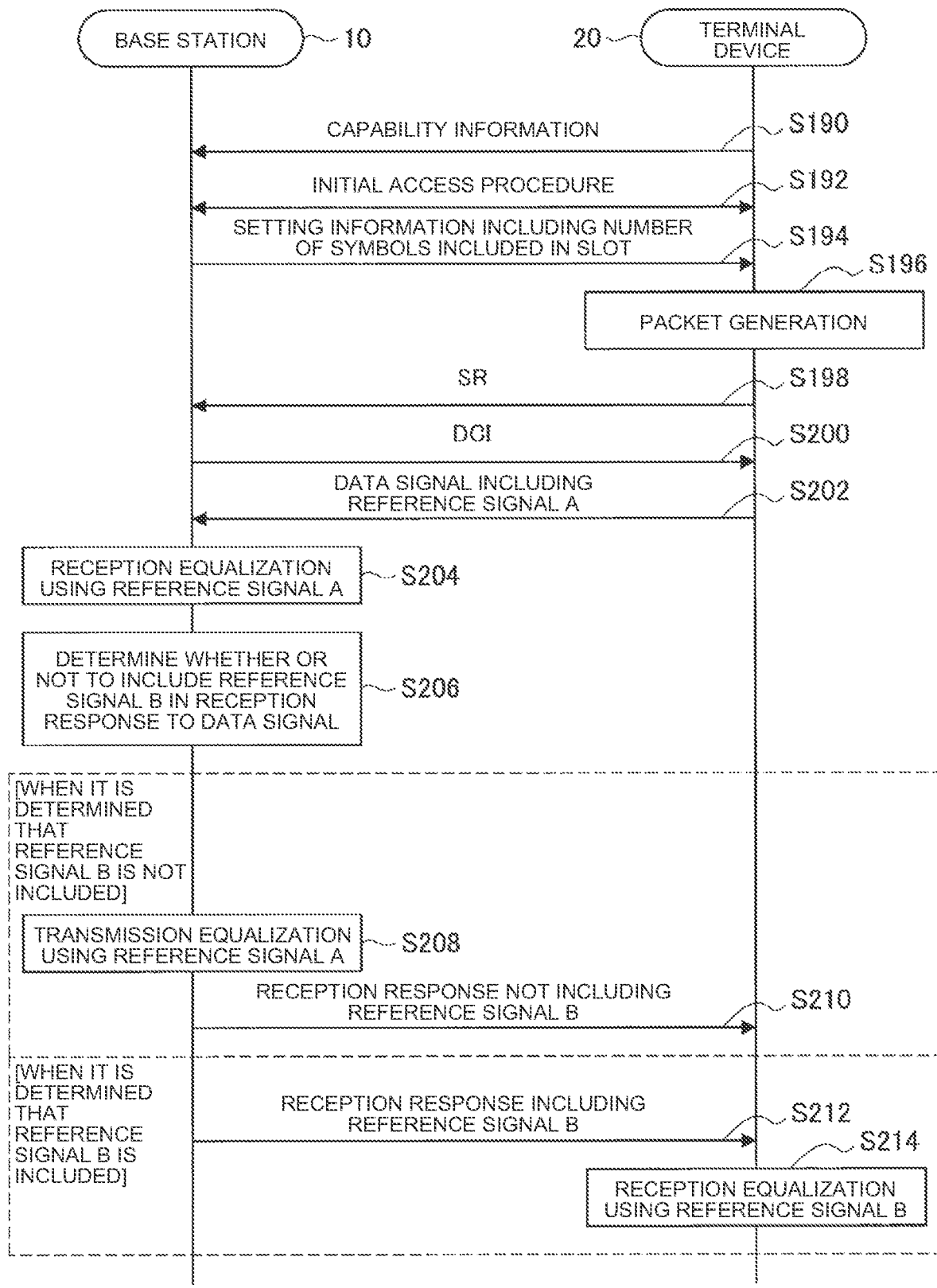
FIG. 10 is a sequence diagram illustrating an example of a flow of switching processing of transmission/non-transmission of a first reference signal executed in the communication system according to the present embodiment.

FIG. 10 is a sequence diagram illustrating an example of a flow of switching processing of transmission/non-transmission of the first reference signal executed in the communication system 1 according to the present embodiment. In the present sequence, the base station 10 and the terminal device 20 are involved. In the present sequence, the base station 10 functions as the first communication device 100 and the communication control device 300, and the terminal device 20 functions as the second communication device 200.

As illustrated in FIG. 10, first, the terminal device 20 transmits capability information to the base station 10 (step S190). Next, the base station 10 and the terminal device 20 execute an initial access procedure (step S192). Next, the base station 10 notifies the terminal device 20 of setting information including the number of symbols included in the slot (step S194). Next, when a packet is generated in the terminal device 20 (step S196), the terminal device 20 notifies the base station 10 of a scheduling request (SR) (step S198). Next, the base station 10 performs scheduling and notifies the terminal device 20 of DCI (step S200). Next, the terminal device 20 transmits a data signal including the reference signal A to the base station 10 (step S202). Next, the base station 10 performs reception equalization using the reference signal A and decodes the data signal (step S204).

After that, the base station 10 determines whether or not to include the reference signal B in the reception response to the data signal (step S206). The determination is performed on the basis of whether or not the number of symbols included in the slot notified in the setting information exceeds a predetermined threshold value. When it is determined that the reference signal B is not included (step S206/NO), the base station 10 performs transmission equalization using the reference signal A (step S208), and transmits a transmission equalized reception response that does not include the reference signal B (step S210). On the other hand, when it is determined that the reference signal B is included (step S206/YES), the base station 10 transmits a reception response including the reference signal B (step S212). Then, the terminal device 20 performs reception equalization using the reference signal B and decodes the reception response (step S214).

Note that, in steps S210 and S212, DCI for retransmission may be transmitted instead of the reception response (ACK/NACK).

(3) Switching Based on Timer or Time Interval

The first communication device 100 may switch whether or not to transmit the first reference signal using the scheduled resource, on the basis of whether or not a predetermined timer has expired or whether or not a time is within a predetermined time interval. Specifically, the first communication device 100 does not transmit the first reference signal using the scheduled resource until the predetermined timer expires or when the time is within the predetermined time interval. On the other hand, when the predetermined timer expires or the time exceeds the predetermined time interval, the first communication device 100 transmits the first reference signal using the scheduled resource. When the elapsed time from the transmission of the first reference signal is short, it is assumed that there is a small change in the channel, so that it is possible to perform reception equalization and transmission equalization by diverting the first reference signal transmitted once.

Start timing of the timer or the time interval is arbitrary. As an example, the start timing may be timing at which the first reference signal has been transmitted using the scheduled resource. Specifically, the first communication device 100 does not transmit the first reference signal using the scheduled resource, until a predetermined time elapses after transmitting the first reference signal using the scheduled resource. Then, after the predetermined time has elapsed, the first communication device 100 transmits the first reference signal again using the scheduled resource. As another example, the start timing of the timer or the time interval may be timing at which the first reference signal has been received by the second communication device 200, or may be a boundary of slots.

As the setting information, for example, the length of the timer or the time interval, the start timing, and the like can be notified.

An example of a flow of switching processing based on the timer or the time interval will be described with reference to FIGS. 11 to 13.

Figure 11:
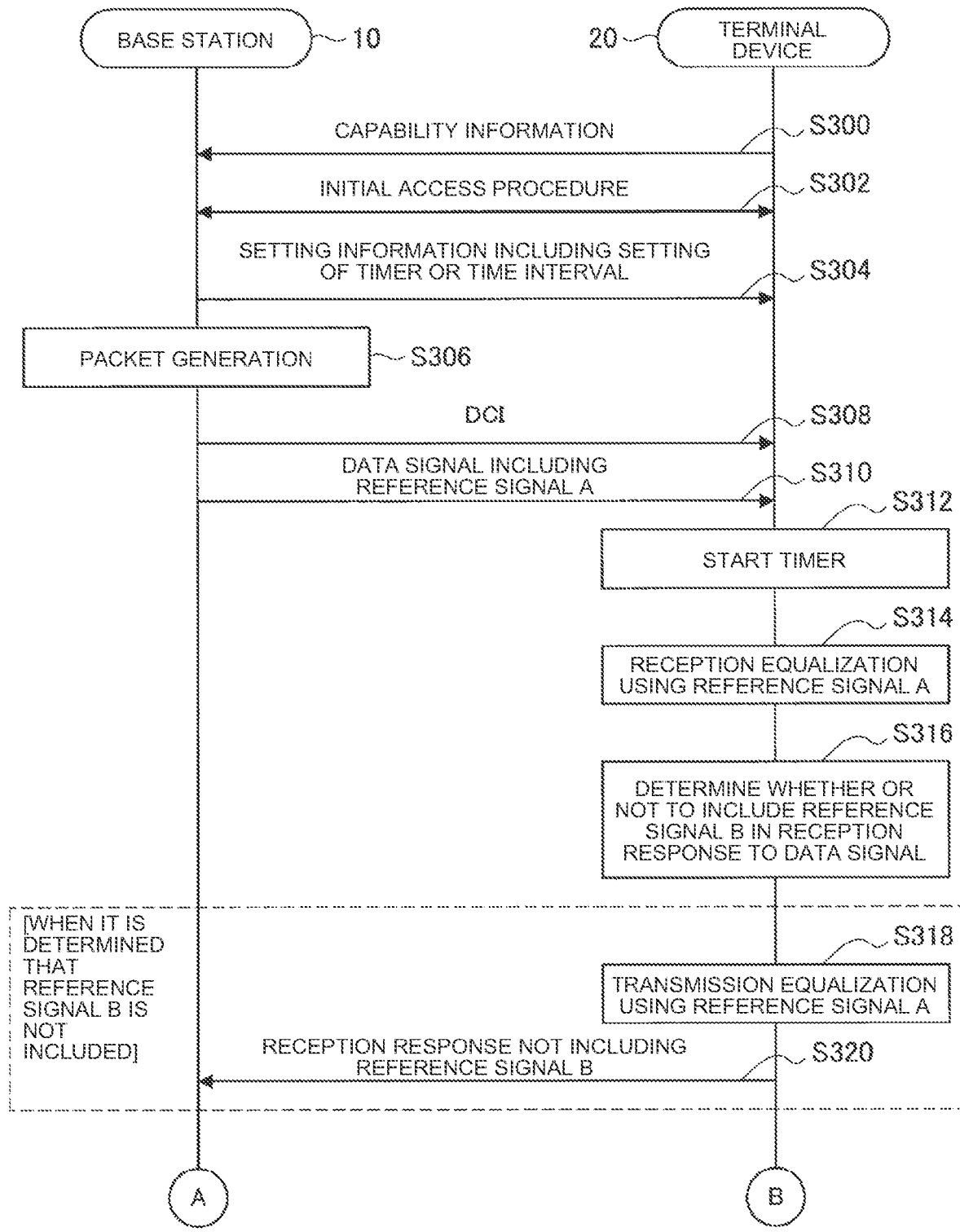
FIG. 11 is a sequence diagram illustrating an example of a flow of switching processing of transmission/non-transmission of a first reference signal executed in the communication system according to the present embodiment.
Figure 12:
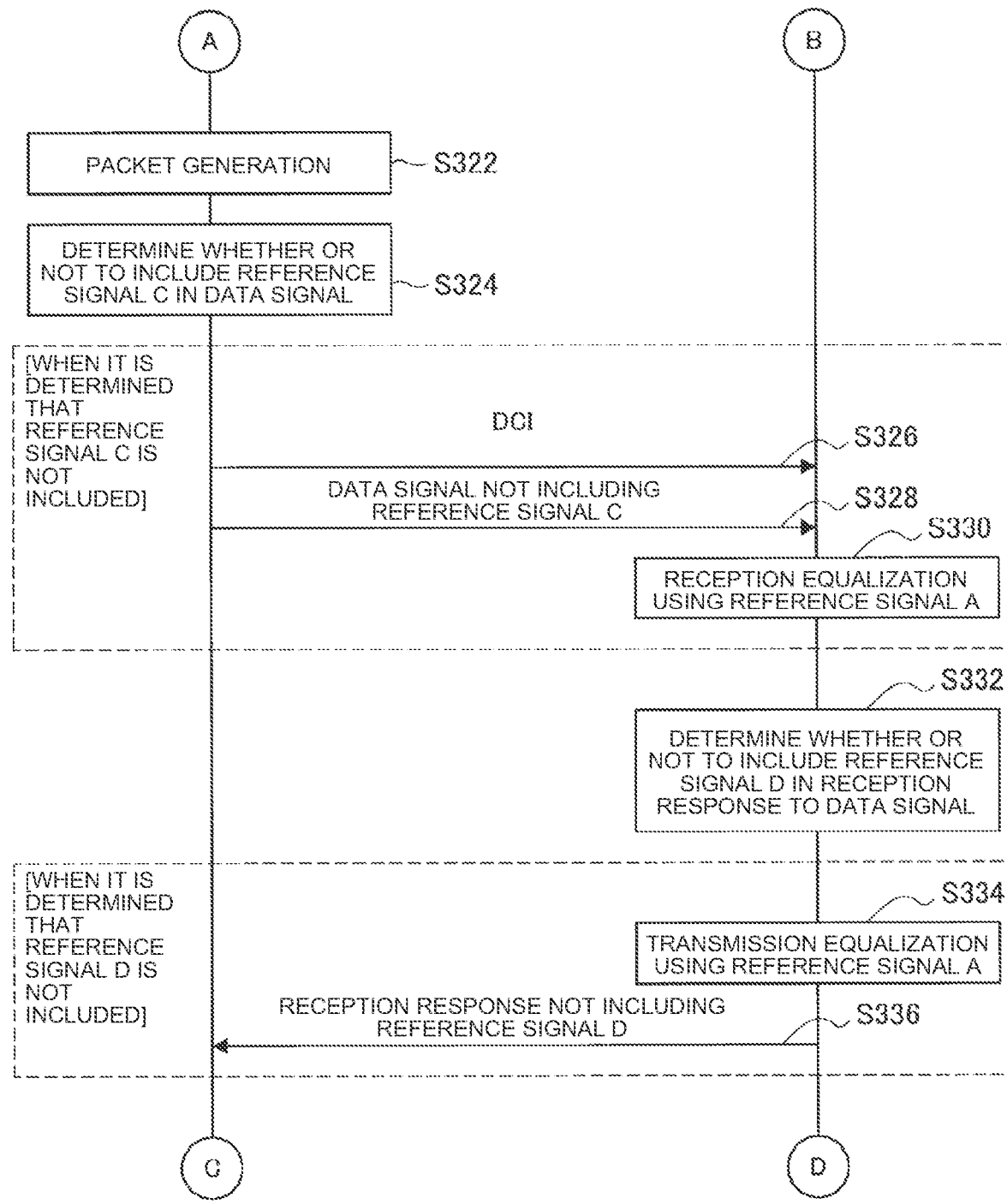
FIG. 12 is a sequence diagram illustrating an example of a flow of switching processing of transmission/non-transmission of a first reference signal executed in the communication system according to the present embodiment.
Figure 13:
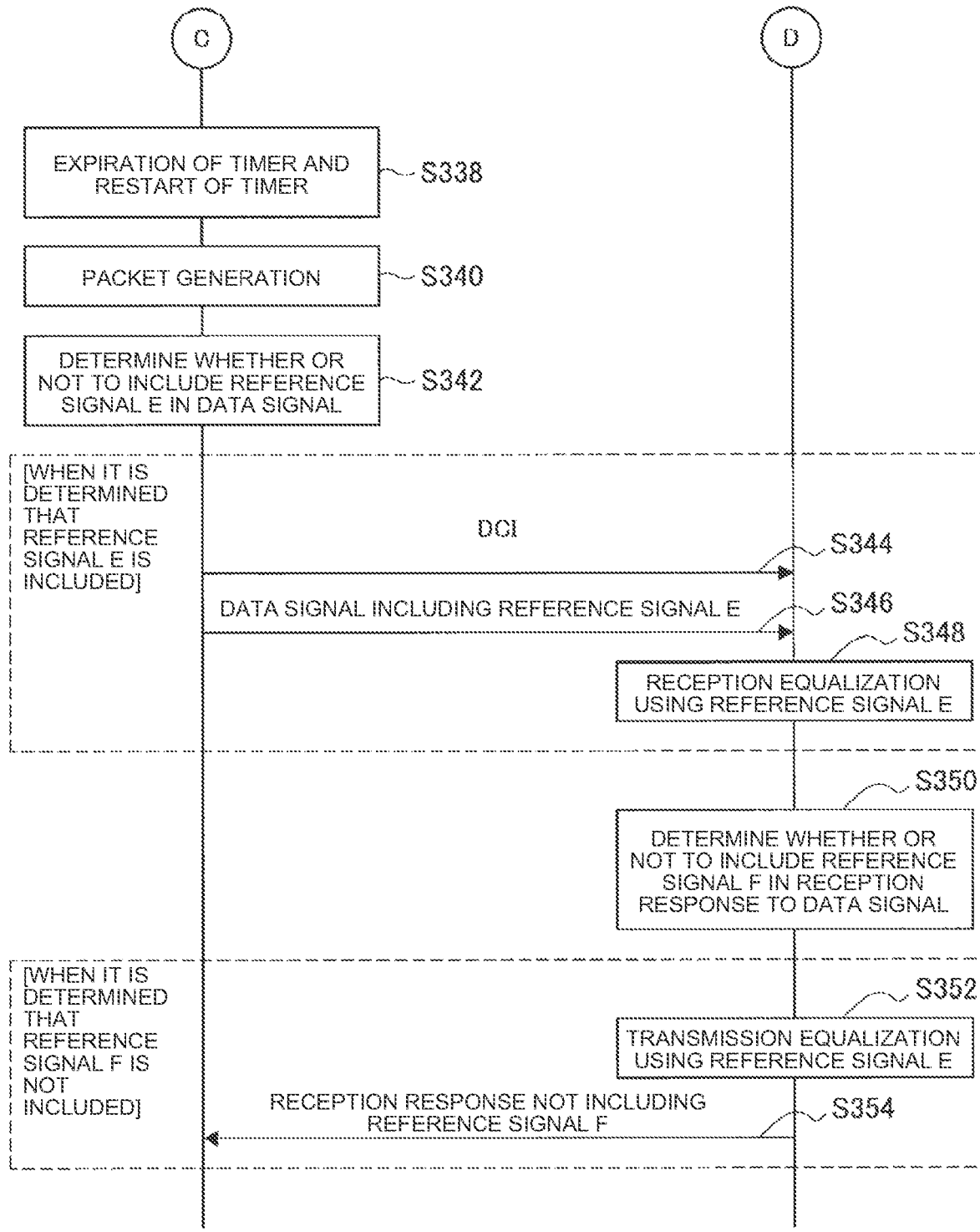
FIG. 13 is a sequence diagram illustrating an example of a flow of switching processing of transmission/non-transmission of a first reference signal executed in the communication system according to the present embodiment.

FIGS. 11 to 13 are sequence diagrams illustrating an example of a flow of switching processing of transmission/non-transmission of the first reference signal executed in the communication system 1 according to the present embodiment. In the present sequence, the base station 10 and the terminal device 20 are involved. In the present sequence, the base station 10 functions as the communication control device 300. Further, the base station 10 and the terminal device 20 function as the first communication device 100 and the second communication device 200, respectively.

Specifically, when one of the base station 10 and the terminal device 20 transmits the first reference signal, both the base station 10 and the terminal device 20 do not transmit the first reference signal using the scheduled resource, until the timer expires or a time exceeds the predetermined time interval. Then, after the timer expires or when the time exceeds the predetermined time interval, one of the base station 10 and the terminal device 20 transmits the first reference signal.

As illustrated in FIG. 11, first, the terminal device 20 transmits capability information to the base station 10 (step S300). Next, the base station 10 and the terminal device 20 execute an initial access procedure (step S302). Next, the base station 10 notifies the terminal device 20 of the setting information including the setting of the timer or the time interval (step S304). Next, when a packet is generated in the base station 10 (step S306), the base station 10 notifies the terminal device 20 of DCI (step S308). Note that the above setting information may be included in the DCI and notified. Next, the base station 10 transmits a data signal including the reference signal A to the terminal device 20 (step S310). Next, the terminal device 20 starts the timer (step S312). Timing at which the timer starts may be timing at which the data signal including the reference signal A has been received, or any other timing. Next, the terminal device 20 performs reception equalization using the reference signal A and decodes the data signal (step S314).

Next, the terminal device 20 determines whether or not to include the reference signal B in the reception response to the data signal (step S316). The determination is performed on the basis of whether or not the timer has expired. At the present timing, since the timer has not expired yet, it is determined that the reference signal B is not included. Therefore, the terminal device 20 performs transmission equalization using the reference signal A (step S318), and transmits a transmission equalized reception response that does not include the reference signal B (step S320).

Then, as illustrated in FIG. 12, when a packet is generated in the base station 10 (step S322), the base station 10 determines whether or not to include a reference signal C in the data signal (step S324). The determination is performed on the basis of whether or not the timer has expired. At the present timing, since the timer has not expired yet, it is determined that the reference signal C is not included. Next, the base station 10 notifies the terminal device 20 of DCI (step S326). Note that the DCI may include setting information for updating timer or time interval information. Next, the base station 10 transmits a data signal not including the reference signal C to the terminal device 20 (step S328). Next, the terminal device 20 performs reception equalization using the reference signal A received in step S310 and decodes the data signal (step S330).

Next, the terminal device 20 determines whether or not to include a reference signal D in the reception response to the data signal (step S332). The determination is performed on the basis of whether or not the timer has expired. At the present timing, since the timer has not expired yet, it is determined that the reference signal D is not included. Therefore, the terminal device 20 performs transmission equalization using the reference signal A (step S334), and transmits a transmission equalized reception response that does not include the reference signal D (step S336).

After that, as illustrated in FIG. 13, the base station 10 detects the expiration of the timer and restarts the timer (step S338). Then, when a packet is generated in the base station 10 (step S340), the base station 10 determines whether or not to include a reference signal E in the data signal (step S342). The determination is performed on the basis of whether or not the timer has expired. At the present timing, since the timer has expired once, it is determined that the reference signal E is included. Next, the base station 10 notifies the terminal device 20 of DCI (step S344). Note that the DCI may include setting information for updating timer or time interval information. Next, the base station 10 transmits a data signal including the reference signal E to the terminal device 20 (step S346). Next, the terminal device 20 performs reception equalization using the reference signal E and decodes the data signal (step S348).

Next, the terminal device 20 determines whether or not to include a reference signal F in the reception response to the data signal (step S350). The determination is performed on the basis of whether or not the timer has expired. At the present timing, since the timer has not expired yet, it is determined that the reference signal F is not included. Therefore, the terminal device 20 performs transmission equalization using the reference signal E (step S352), and transmits a transmission equalized reception response that does not include the reference signal F (step S354).

(4) Switching Based on Number of Repeated Transmissions

The first communication device 100 may switch whether or not to transmit the first reference signal using the scheduled resource, on the basis of the number of repeated transmissions. When the number of repeated transmissions is less than a predetermined threshold value, the first communication device 100 does not transmit the first reference signal using the scheduled resource. For example, when the number of repeated transmissions is less than N, the first communication device 100 transmits the first reference signal using the scheduled resource only for the first time, and does not transmit the first reference signal using the first resource for the second and subsequent times. On the other hand, when the number of repeated transmissions is equal to or more than the predetermined threshold value, the first communication device 100 transmits the first reference signal using the scheduled resource for the first time. Then, the first communication device 100 transmits the first reference signal using the scheduled resource periodically, and does not transmit the first reference signal using the scheduled resource at other timings. For example, when the number of repeated transmissions is equal to or more than N, the first communication device 100 transmits the first reference signal using the scheduled resource for the first time, and transmits the first reference signal using the first resource every predetermined number of times (for example, every N times) for the second and subsequent times. When the number of repeated transmissions after transmitting the first reference signal is small, the elapsed time from the transmission of the first reference signal is short, and it is assumed that there is a small change in the channel. Therefore, it is possible to perform reception equalization by diverting the first reference signal transmitted once.

Here, the periodic transmission indicates, for example, that the first reference signal is transmitted every time the transmission is repeated twice. When the total number of repeated transmissions is 4 or more, the first reference signal is included in the first transmission, the first reference signal is not included in the second transmission, the first reference signal is included in the third transmission, and the first reference signal is not included in the fourth transmission. Of course, the total number of repeated transmissions and the transmission interval are not limited to the above examples.

As the setting information, for example, a predetermined threshold value related to the number of repeated transmissions can be notified. Further, as the setting information, for example, an interval of the number of repeated transmissions in which the first reference signal should be transmitted (for example, every two times in the above example) can be notified. Note that the predetermined threshold value related to the number of repeated transmissions and the interval of the number of repeated transmissions in which the first reference signal should be transmitted may be the same value. For example, when the number of repeated transmissions is N or more, the first reference signal may be transmitted every N times.

An example of a flow of switching processing based on the number of repeated transmissions will be described with reference to FIGS. 14 and 15.

Figure 14:
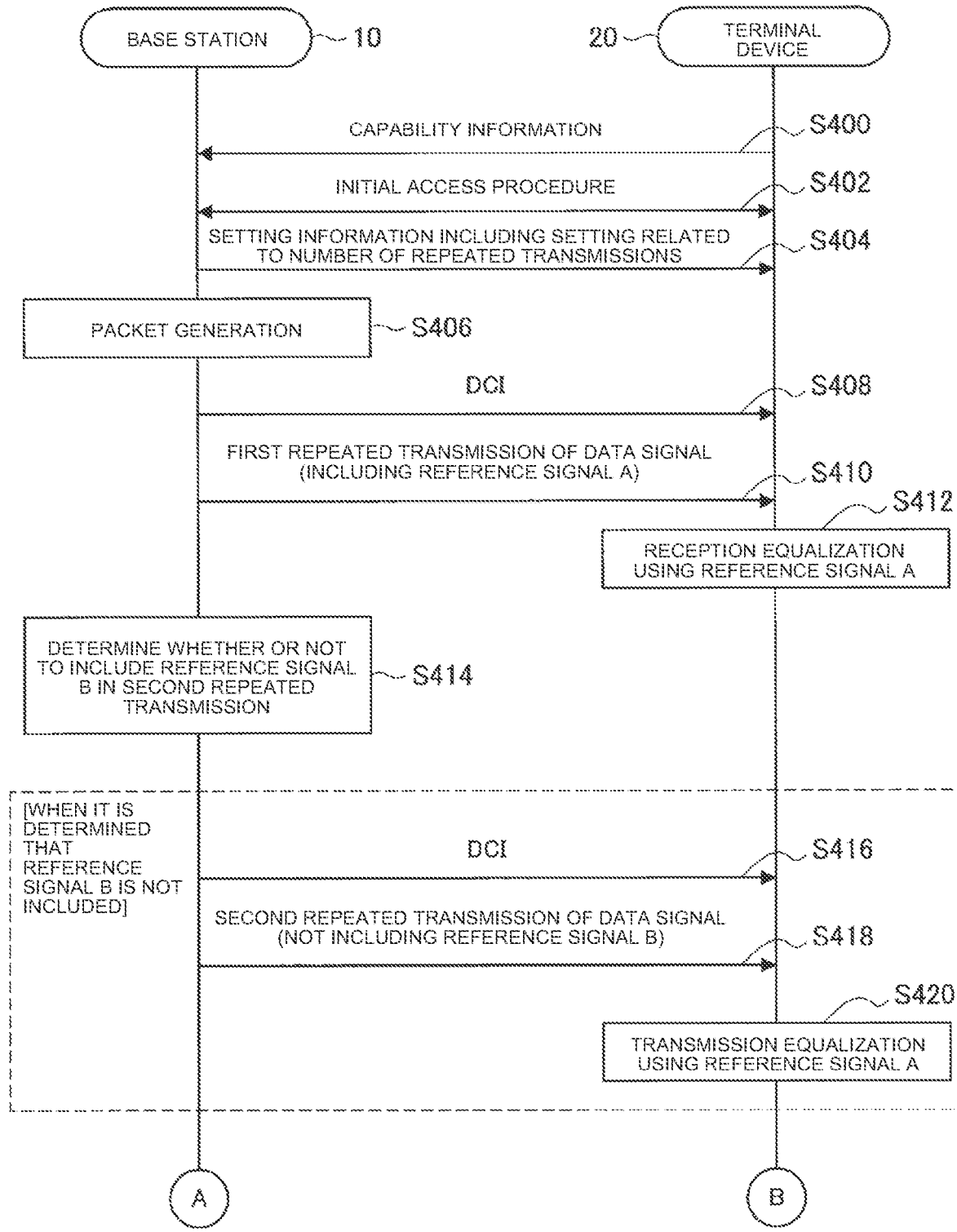
FIG. 14 is a sequence diagram illustrating an example of a flow of switching processing of transmission/non-transmission of a first reference signal executed in the communication system according to the present embodiment.
Figure 15:
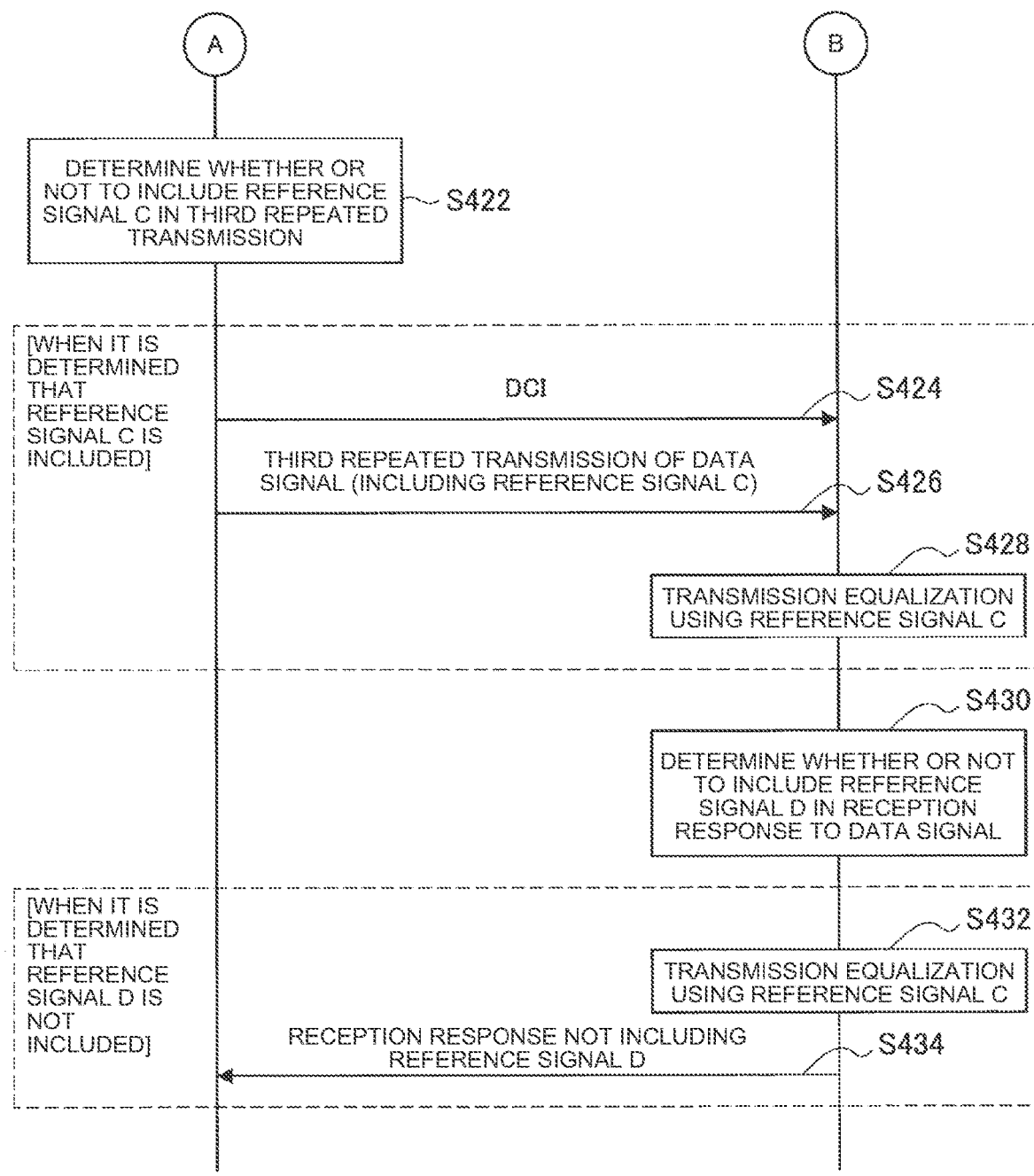
FIG. 15 is a sequence diagram illustrating an example of a flow of switching processing of transmission/non-transmission of a first reference signal executed in the communication system according to the present embodiment.

FIGS. 14 and 15 are sequence diagrams illustrating an example of a flow of switching processing of transmission/non-transmission of the first reference signal executed in the communication system 1 according to the present embodiment. In the present sequence, the base station 10 and the terminal device 20 are involved. In the present sequence, the base station 10 functions as the communication control device 300. Further, the base station 10 and the terminal device 20 function as the first communication device 100 and the second communication device 200, respectively. In the present sequence, for example, it is assumed that the first reference signal is transmitted every time the number of repeated transmissions N=2 after the first transmission.

As illustrated in FIG. 14, first, the terminal device 20 transmits capability information to the base station 10 (step S400). Next, the base station 10 and the terminal device 20 execute an initial access procedure (step S402). Next, the base station 10 notifies the terminal device 20 of setting information including the setting related to the number of repeated transmissions N (step S404). Next, when a packet is generated in the base station 10 (step S406), the base station 10 notifies the terminal device 20 of DCI (step S408). Note that the above setting information may be included in the DCI and notified. Next, the base station 10 transmits a data signal including the reference signal A to the terminal device 20 as the first transmission of the data signal (first repeated transmission) (step S410). Next, the terminal device 20 performs reception equalization using the reference signal A and decodes the data signal (step S412).

Next, the base station 10 determines whether or not to include the reference signal B in the second repeated transmission (step S414). The determination is performed on the basis of a relation between the number of repeated transmissions N notified in the setting information and the current number of repeated transmissions. Here, since the transmission is the second repeated transmission and is the first repeated transmission after the first transmission, it is determined that the reference signal B is not included. Next, the base station 10 notifies the terminal device 20 of DCI (step S416). Next, the base station 10 transmits a data signal not including the reference signal B to the terminal device 20 as the second repeated transmission of the data signal (step S418). Next, the terminal device 20 performs transmission equalization using the reference signal A received in step S410 (step S420).

After that, as illustrated in FIG. 15, the base station 10 determines whether or not to include the reference signal C in the third repeated transmission (step S422). Here, since the transmission is the third repeated transmission and is the second repeated transmission after the first transmission, it is determined that the reference signal C is included. Next, the base station 10 notifies the terminal device 20 of DCI (step S424). Next, the base station 10 transmits a data signal including the reference signal C to the terminal device 20 as the third repeated transmission of the data signal (step S426). Next, the terminal device 20 performs transmission equalization using the reference signal C (step S428).

Next, the terminal device 20 determines whether or not to include the reference signal D in the reception response to the data signal (step S430). The determination is performed on the basis of whether or not an elapsed time from the reception of the data signal to the transmission of the reception response exceeds a predetermined threshold value. Here, it is assumed that it is determined that the reference signal D is not included. Therefore, the terminal device 20 performs transmission equalization using the reference signal C (step S432), and transmits a transmission equalized reception response that does not include the reference signal D (step S434).

(5) Switching Based on Duplex System

The first communication device 100 may switch whether or not to transmit the first reference signal using the scheduled resource, on the basis of a duplex system. Here, the duplex system is a duplex system in communication between the first communication device 100 and the second communication device 200.

As an example, when the duplex system is time division duplex, the first communication device 100 does not transmit the reference signal in the scheduled resource. This is because, in a case of the time division duplex, a frequency used for bidirectional communication is the same, so that channel information related to the bidirectional communication is the same or similar, and transmission equalization based on the channel information obtained by the second reference signal becomes possible. On the other hand, when the duplex system is frequency division duplex, the first communication device 100 transmits the reference signal in the scheduled resource. This is because, in a case of the frequency division duplex, a frequency used for bidirectional communication is different, so that channel information related to the bidirectional communication is different, and transmission equalization based on the channel information obtained by the second reference signal becomes difficult.

As another example, the first communication device 100 may not transmit a reference signal in the scheduled resource regardless of whether the duplex system is the time division duplex or the frequency division duplex.

As the setting information, for example, information indicating the duplex system can be notified.

An example of switching processing based on the duplex system will be described with reference to FIGS. 16 and 17.

Figure 16:
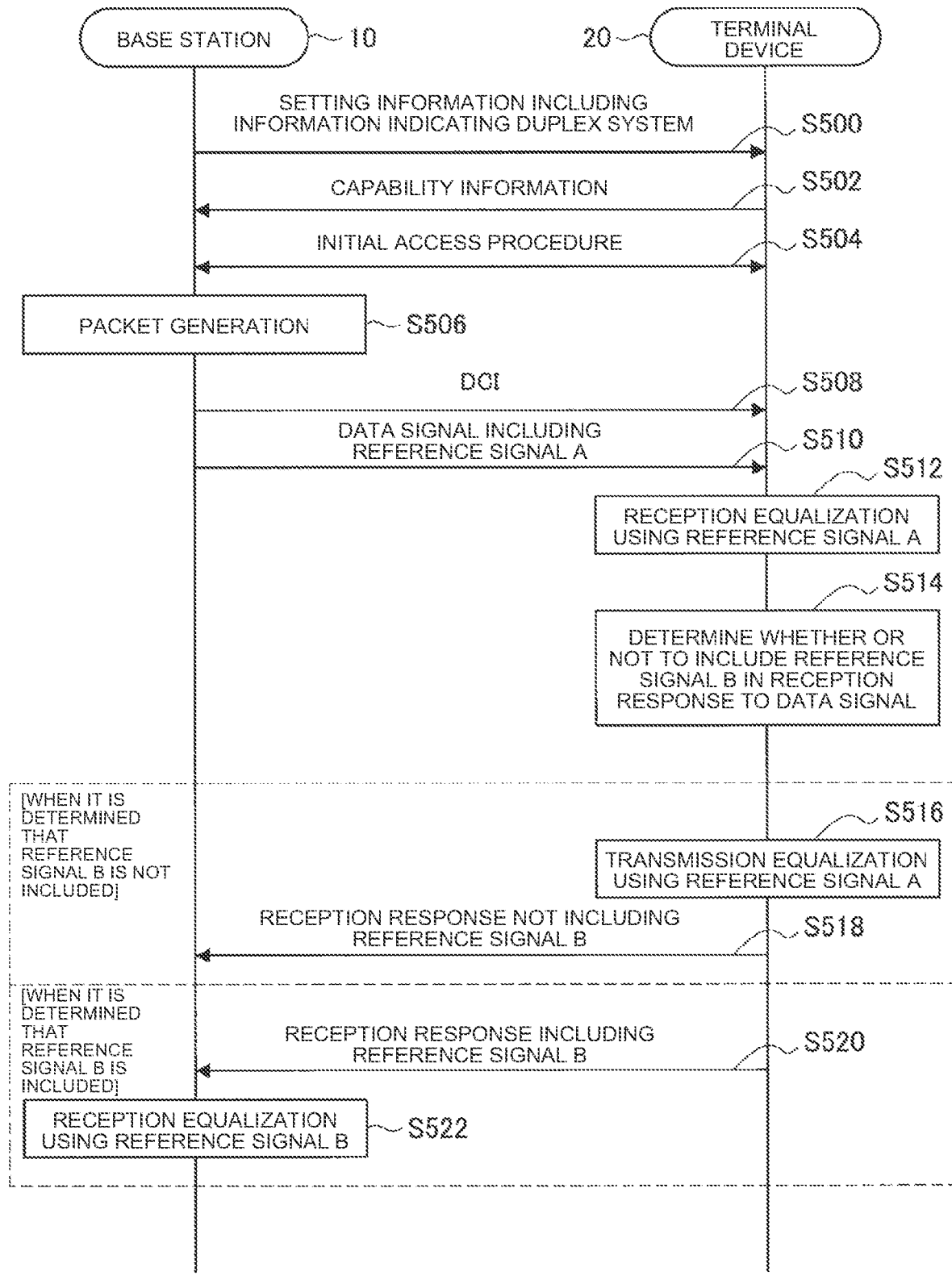
FIG. 16 is a sequence diagram illustrating an example of a flow of switching processing of transmission/non-transmission of a first reference signal executed in the communication system according to the present embodiment.

FIG. 16 is a sequence diagram illustrating an example of a flow of switching processing of transmission/non-transmission of the first reference signal executed in the communication system 1 according to the present embodiment. In the present sequence, the base station 10 and the terminal device 20 are involved. In the present sequence, the base station 10 functions as the second communication device 200 and the communication control device 300, and the terminal device 20 functions as the first communication device 100.

As illustrated in FIG. 16, first, the first communication device 100 notifies the terminal device 20 of setting information including the information indicating the duplex system (step S500). Next, the terminal device 20 transmits capability information to the base station 10 (step S502). Next, the base station 10 and the terminal device 20 execute an initial access procedure (step S504). Next, when a packet is generated in the base station 10 (step S506), the base station 10 notifies the terminal device 20 of DCI (step S508). Next, the base station 10 transmits a data signal including the reference signal A to the terminal device 20 (step S510). Next, the terminal device 20 performs reception equalization using the reference signal A and decodes the data signal (step S512).

After that, the terminal device 20 determines whether or not to include the reference signal B in the reception response to the data signal (step S514). The determination is performed on the basis of the duplex system notified in the setting information. When it is determined that the reference signal B is not included (step S514/NO), the terminal device 20 performs transmission equalization using the reference signal A (step S516), and transmits a transmission equalized reception response that does not include the reference signal B (step S518). On the other hand, when it is determined that the reference signal B is included (step S514/YES), the terminal device 20 transmits a reception response including the reference signal B (step S520). Then, the base station 10 performs reception equalization using the reference signal B and decodes the reception response (step S522).

Figure 17:
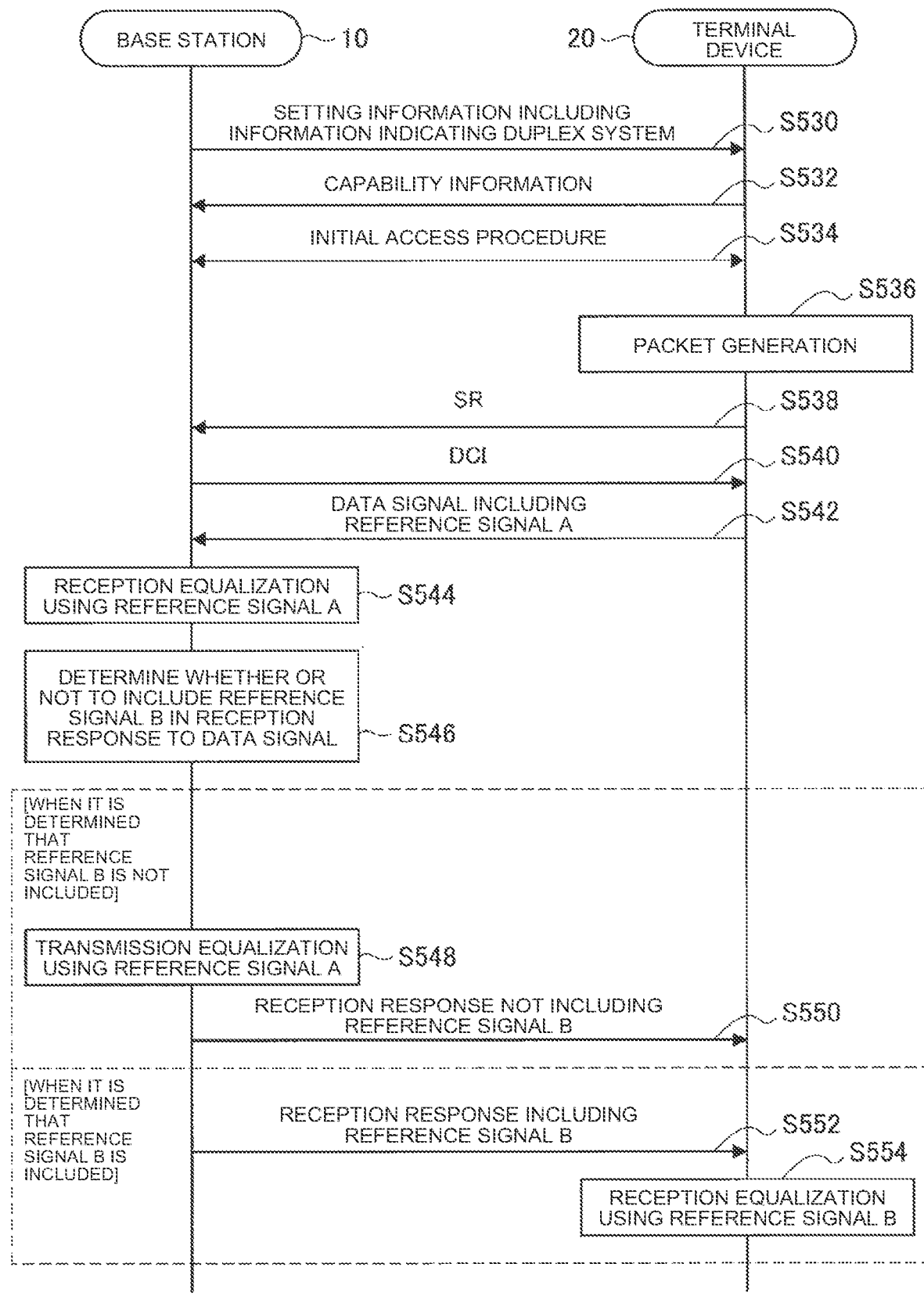
FIG. 17 is a sequence diagram illustrating an example of a flow of switching processing of transmission/non-transmission of a first reference signal executed in the communication system according to the present embodiment.

FIG. 17 is a sequence diagram illustrating an example of a flow of switching processing of transmission/non-transmission of the first reference signal executed in the communication system 1 according to the present embodiment. In the present sequence, the base station 10 and the terminal device 20 are involved. In the present sequence, the base station 10 functions as the first communication device 100 and the communication control device 300, and the terminal device 20 functions as the second communication device 200.

As illustrated in FIG. 17, first, the first communication device 100 notifies the terminal device 20 of setting information including the information indicating the duplex system (step S530). Next, the terminal device 20 transmits capability information to the base station 10 (step S532). Next, the base station 10 and the terminal device 20 execute an initial access procedure (step S534). Next, when a packet is generated in the terminal device 20 (step S536), the terminal device 20 notifies the base station 10 of a scheduling request (SR) (step S538). Next, the base station 10 performs scheduling and notifies the terminal device 20 of DCI (step S540). Next, the terminal device 20 transmits a data signal including the reference signal A to the base station 10 (step S542). Next, the base station 10 performs reception equalization using the reference signal A and decodes the data signal (step S544).

After that, the base station 10 determines whether or not to include the reference signal B in the reception response to the data signal (step S546). The determination is performed on the basis of the duplex system notified in the setting information. When it is determined that the reference signal B is not included (step S546/NO), the base station 10 performs transmission equalization using the reference signal A (step S548), and transmits a transmission equalized reception response that does not include the reference signal B (step S550). On the other hand, when it is determined that the reference signal B is included (step S546/YES), the base station 10 transmits a reception response including the reference signal B (step S552). Then, the terminal device 20 performs reception equalization using the reference signal B and decodes the reception response (step S554).

Note that, in steps S550 and S552, DCI for retransmission may be transmitted instead of the reception response (ACK/NACK).

(6) Switching Based on Beam Correspondence

The first communication device 100 may switch whether or not to transmit the first reference signal using the scheduled resource, on the basis of whether or not a beam correspondence is held. Here, the beam correspondence relates to a relation between a transmission beam and a reception beam of the first communication device 100 suitable for communication with the second communication device 200. When the beam correspondence is held, it means that at least one of a case where the transmission beam can be determined on the basis of the reception beam and a case where the reception beam can be determined on the basis of the transmission beam is realized. When the beam correspondence is not held, it means that both the above cases are not realized.

As an example, when the beam correspondence is held, the first communication device 100 does not transmit the first reference signal using the scheduled resource. This is because, in the case where the beam correspondence is held, it is assumed that channel information related to bidirectional communication is the same or similar, and transmission equalization based on the channel information obtained by the second reference signal becomes possible. On the other hand, when the beam correspondence is not held, the first communication device 100 transmits the first reference signal using the scheduled resource.

As the setting information, for example, information regarding the beam correspondence can be notified. Examples of the information regarding the beam correspondence include position information of the second communication device 200, information indicating the mobility of the second communication device 200, and information indicating that the first communication device 100 or the second communication device 200 currently holds the beam correspondence.

An example of switching processing based on the beam correspondence will be described with reference to FIGS. 18 and 19.

Figure 18:
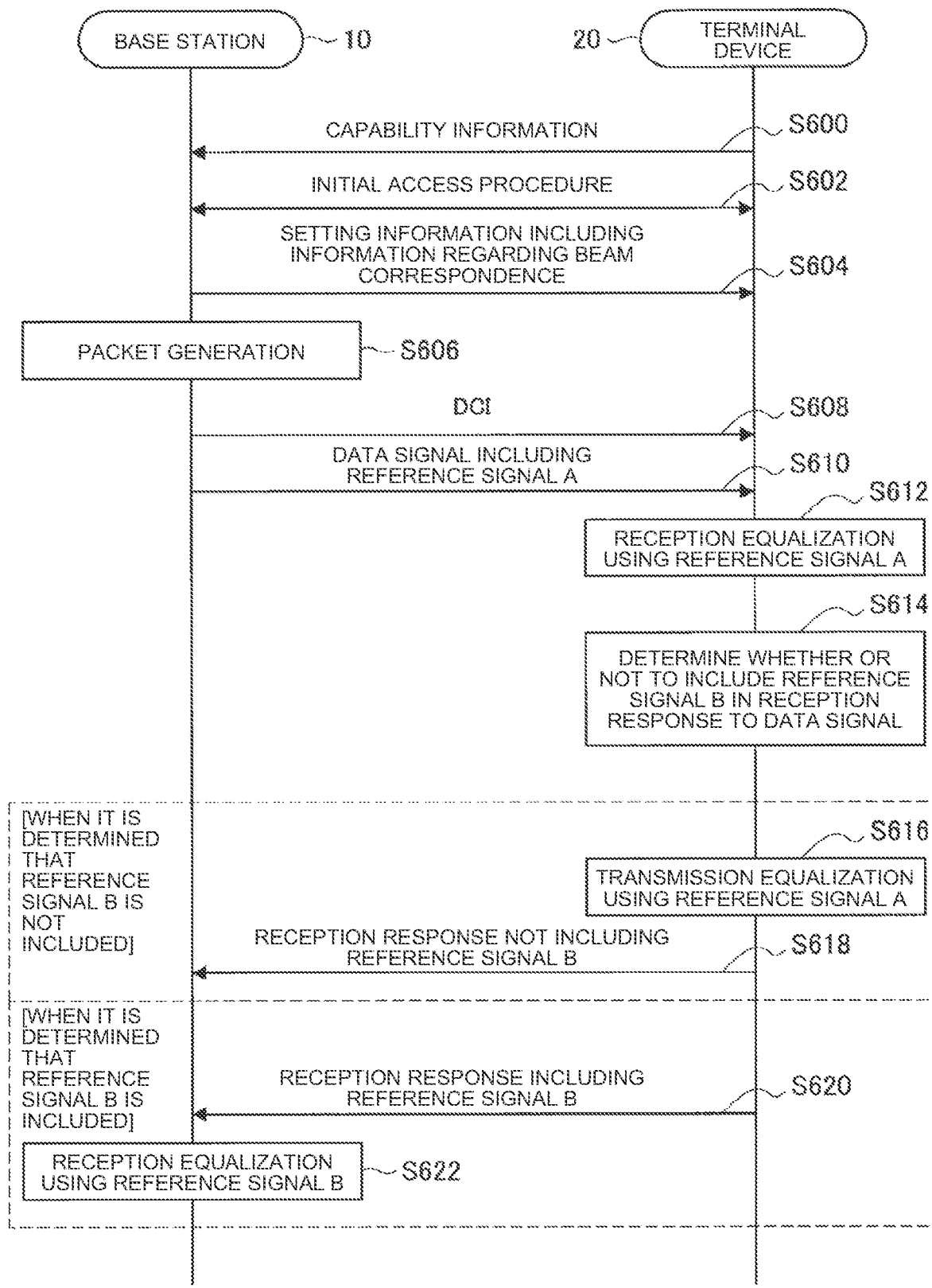
FIG. 18 is a sequence diagram illustrating an example of a flow of switching processing of transmission/non-transmission of a first reference signal executed in the communication system according to the present embodiment.

FIG. 18 is a sequence diagram illustrating an example of a flow of switching processing of transmission/non-transmission of the first reference signal executed in the communication system 1 according to the present embodiment. In the present sequence, the base station 10 and the terminal device 20 are involved. In the present sequence, the base station 10 functions as the second communication device 200 and the communication control device 300, and the terminal device 20 functions as the first communication device 100.

As illustrated in FIG. 18, first, the terminal device 20 transmits capability information to the base station 10 (step S600). Next, the base station 10 and the terminal device 20 execute an initial access procedure (step S602). Next, the base station 10 notifies the terminal device 20 of setting information including the information regarding the beam correspondence (step S604). Next, when a packet is generated in the base station 10 (step S606), the base station 10 notifies the terminal device 20 of DCI (step S608). Note that the above setting information may be included in the DCI and notified. Next, the base station 10 transmits a data signal including the reference signal A to the terminal device 20 (step S610). Next, the terminal device 20 performs reception equalization using the reference signal A and decodes the data signal (step S612).

After that, the terminal device 20 determines whether or not to include the reference signal B in the reception response to the data signal (step S614). The determination is performed on the basis of whether or not the beam correspondence is held. When it is determined that the reference signal B is not included (step S614/NO), the terminal device 20 performs transmission equalization using the reference signal A (step S616), and transmits a transmission equalized reception response that does not include the reference signal B (step S618). On the other hand, when it is determined that the reference signal B is included (step S614/YES), the terminal device 20 transmits a reception response including the reference signal B (step S620). Then, the base station 10 performs reception equalization using the reference signal B and decodes the reception response (step S622).

Figure 19:
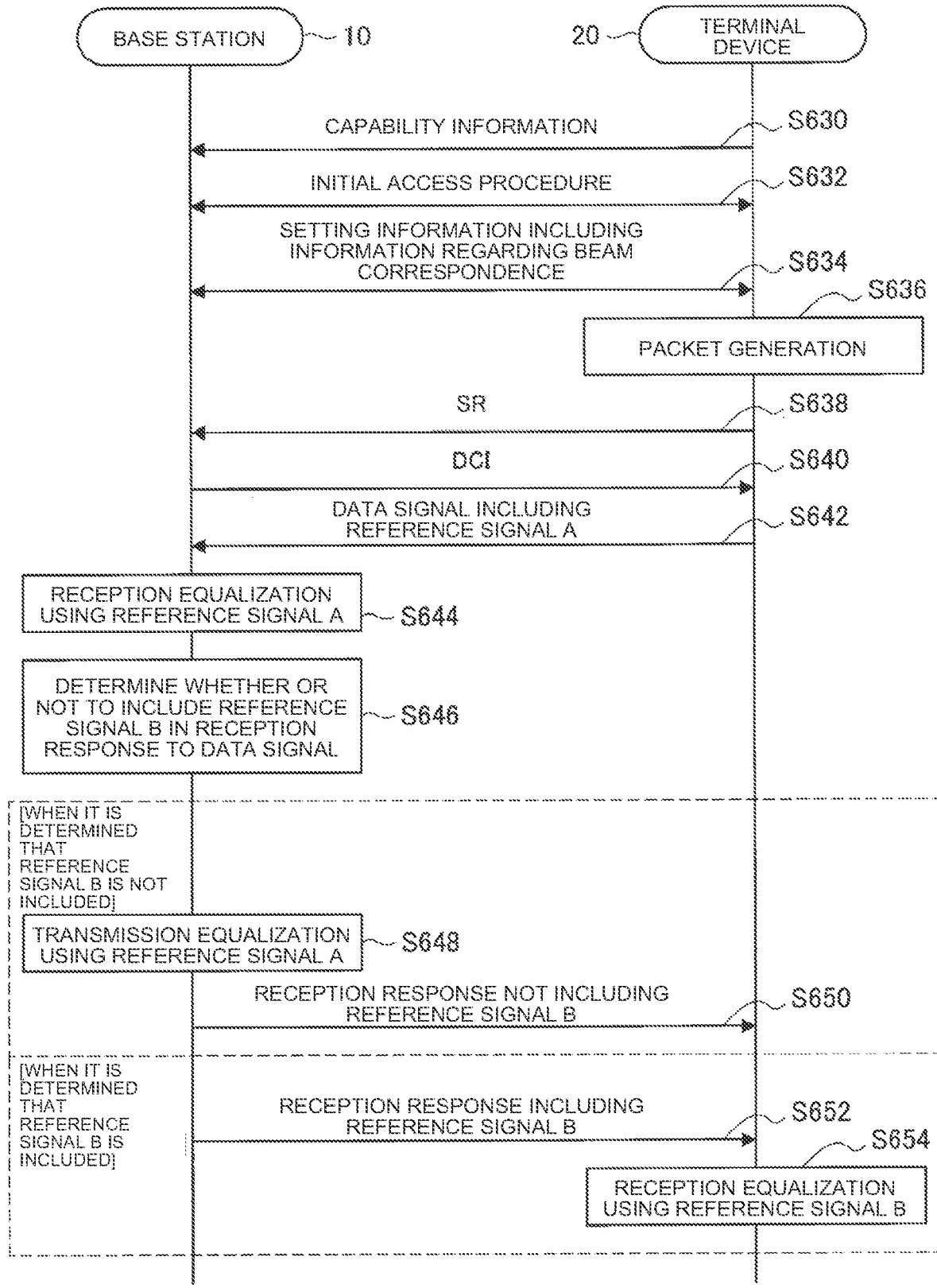
FIG. 19 is a sequence diagram illustrating an example of a flow of switching processing of transmission/non-transmission of a first reference signal executed in the communication system according to the present embodiment.

FIG. 19 is a sequence diagram illustrating an example of a flow of switching processing of transmission/non-transmission of the first reference signal executed in the communication system 1 according to the present embodiment. In the present sequence, the base station 10 and the terminal device 20 are involved. In the present sequence, the base station 10 functions as the first communication device 100 and the communication control device 300, and the terminal device 20 functions as the second communication device 200.

As illustrated in FIG. 19, first, the terminal device 20 transmits capability information to the base station 10 (step S630). Next, the base station 10 and the terminal device 20 execute an initial access procedure (step S632). Next, the base station 10 notifies the terminal device 20 of setting information including the information regarding the beam correspondence, or the terminal device 20 notifies the base station device 10 of information indicating that the beam correspondence is currently held (step S634). Next, when a packet is generated in the terminal device 20 (step S636), the terminal device 20 notifies the base station 10 of a scheduling request (SR) (step S638). Next, the base station 10 performs scheduling and notifies the terminal device 20 of DCI (step S640). Next, the terminal device 20 transmits a data signal including the reference signal A to the base station 10 (step S642). Next, the base station 10 performs reception equalization using the reference signal A and decodes the data signal (step S644).

After that, the base station 10 determines whether or not to include the reference signal B in the reception response to the data signal (step S646). The determination is performed on the basis of whether or not the beam correspondence is held. When it is determined that the reference signal B is not included (step S646/NO), the base station 10 performs transmission equalization using the reference signal A (step S648), and transmits a transmission equalized reception response that does not include the reference signal B (step S650). On the other hand, when it is determined that the reference signal B is included (step S646/YES), the base station 10 transmits a reception response including the reference signal B (step S652). Then, the terminal device 20 performs reception equalization using the reference signal B and decodes the reception response (step S654).

Note that, in steps S650 and S652, DCI for retransmission may be transmitted instead of the reception response (ACK/NACK).

<<4. Application Example>>

The technology according to the present disclosure can be applied to various products. For example, the communication control device 300 may be realized as any type of server such as a tower server, a rack server, or a blade server. Further, the communication control device 300 may be a control module mounted on the server (for example, an integrated circuit module formed of one die, or a card or blade inserted into a slot of the blade server).

Further, for example, each of the first communication device 100, the second communication device 200, and the communication control device 300 may be realized as any type of evolved Node B (eNB) such as a macro eNB or a small eNB. The small eNB may be an eNB that covers a cell smaller than a macro cell, such as a pico eNB, a micro eNB, or a home (femto) eNB. Instead, each of the first communication device 100, the second communication device 200, and the communication control device 300 may be realized as another type of base station such as a Node B or a base transceiver station (BTS). Each of the first communication device 100, the second communication device 200, and the communication control device 300 may include a main body (also called a base station device) that controls wireless communication and one or more remote radio heads (RRHs) that are disposed at a location different from a location of the main body. Further, various types of terminals, which will be described later, may operate as the first communication device 100, the second communication device 200, and the communication control device 300 by temporarily or semi-permanently executing a base station function.

Further, for example, each of the first communication device 100, the second communication device 200, and the communication control device 300 may be realized as a smartphone, a tablet personal computer (PC), a notebook PC, a portable game terminal, a mobile terminal such as a portable/dongle type mobile router or a digital camera, or an in-vehicle terminal such as a car navigation device. Further, each of the first communication device 100, the second communication device 200, and the communication control device 300 may be realized as a terminal (also called a machine type communication (MTC) terminal) that performs machine to machine (M2M) communication. Further, each of the first communication device 100, the second communication device 200, and the communication control device 300 may be a wireless communication module (for example, an integrated circuit module formed of one die) mounted on the terminal.

<4.1. Application Example Related to Communication Control Device>

Figure 20:
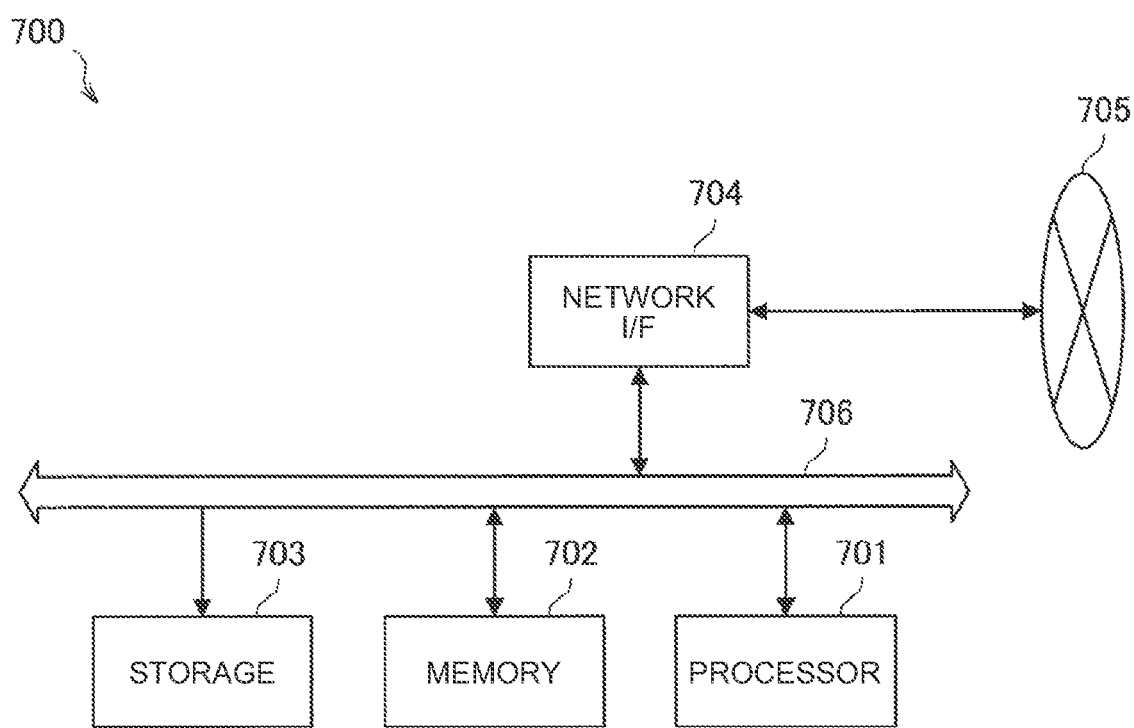
FIG. 20 is a block diagram illustrating an example of a schematic configuration of a server.

FIG. 20 is a block diagram illustrating an example of a schematic configuration of a server 700 to which the technology according to the present disclosure can be applied. The server 700 includes a processor 701, a memory 702, a storage 703, a network interface 704, and a bus 706.

The processor 701 may be, for example, a central processing unit (CPU) or a digital signal processor (DSP), and controls various functions of the server 700. The memory 702 includes a random access memory (RAM) and a read only memory (ROM), and stores programs and data executed by the processor 701. The storage 703 can include a storage medium such as a semiconductor memory or a hard disk.

The network interface 704 is a wired communication interface for connecting the server 700 to a wired communication network 705. The wired communication network 705 may be a core network such as an evolved packet core (EPC) or a packet data network (PDN) such as the Internet.

The bus 706 connects the processor 701, the memory 702, the storage 703, and the network interface 704 to each other. The bus 706 may include two or more buses (for example, a high-speed bus and a low-speed bus) having different speeds.

In the server 700 illustrated in FIG. 20, one or more components (for example, the notification unit 331) included in the control unit 330 described with reference to FIG. 6 may be mounted in the processor 701. As an example, a program for causing the processor to function as one or more of the above components (in other words, a program for causing the processor to execute the operations of one or more of the above components) may be installed on the server 700, and the processor 701 may execute the program. As another example, the server 700 may be equipped with a module including the processor 701 and the memory 702, and one or more of the above components may be mounted in the module. In this case, the module may store a program for causing the processor to function as one or more of the above components in the memory 702 and may execute the program by the processor 701. As described above, the server 700 or the module may be provided as a device including one or more of the above components, and the program for causing the processor to function as one or more of the above components may be provided. Further, a readable recording medium on which the above program has been recorded may be provided.

Further, in the server 700 illustrated in FIG. 20, for example, the communication unit 310 described with reference to FIG. 6 may be mounted in the network interface 704. Further, the storage unit 320 may be mounted in the memory 702 and/or the storage 703.

<4.2. Application Example Related to Base Station>

(First Application Example)

Figure 21:
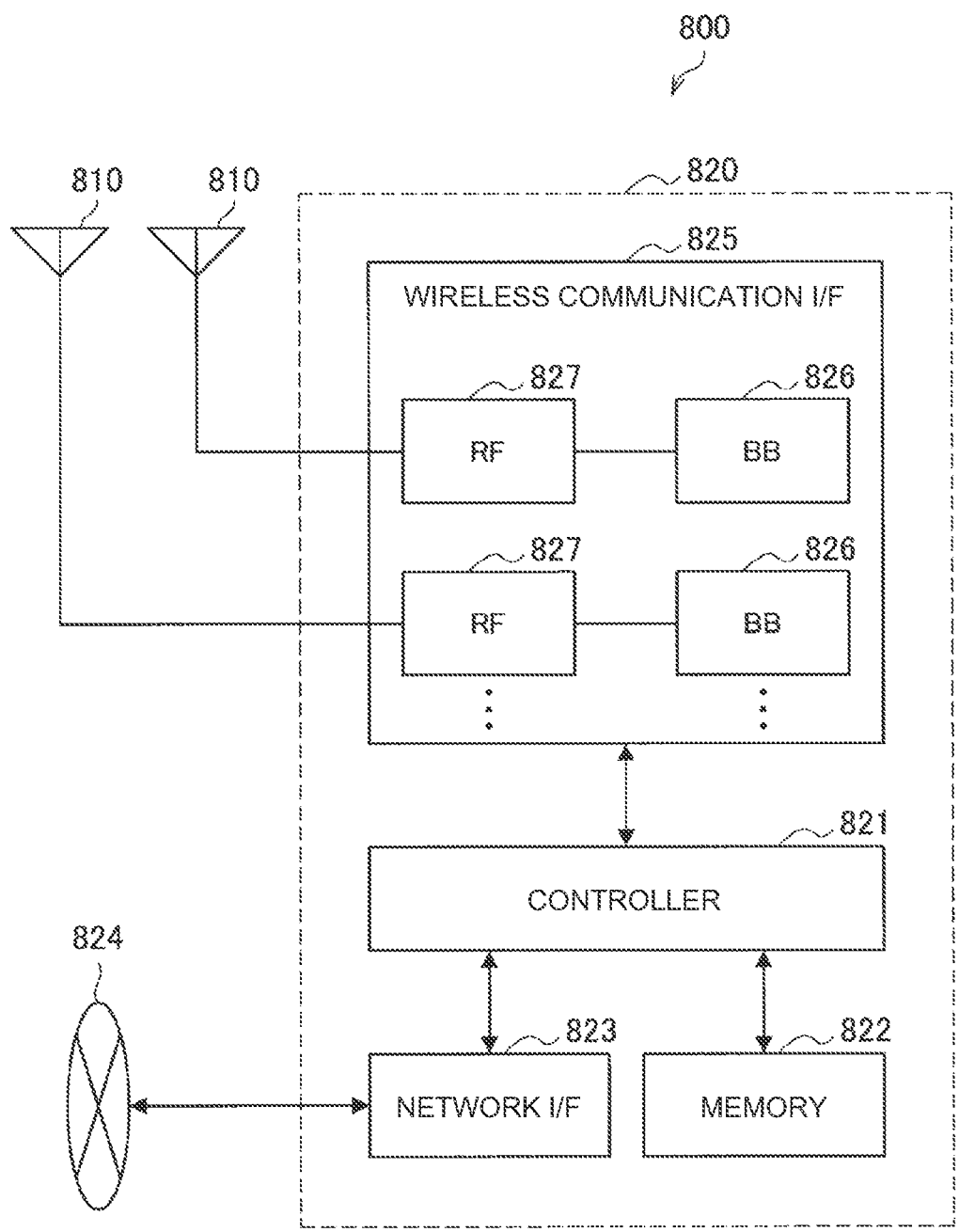
FIG. 21 is a block diagram illustrating a first example of a schematic configuration of an eNB.

FIG. 21 is a block diagram illustrating a first example of a schematic configuration of an eNB to which the technology according to the present disclosure can be applied. An eNB 800 has one or more antennas 810 and a base station device 820. Each antenna 810 and the base station device 820 can be connected to each other via an RF cable.

Each of the antennas 810 has one or more antenna elements (for example, a plurality of antenna elements forming a MIMO antenna) and is used for transmission and reception of radio signals by the base station device 820. The eNB 800 has a plurality of antennas 810 as illustrated in FIG. 21, and the plurality of antennas 810 may correspond to a plurality of frequency bands used by the eNB 800, for example. Although FIG. 21 illustrates an example in which the eNB 800 has the plurality of antennas 810, the eNB 800 may have a single antenna 810.

The base station device 820 includes a controller 821, a memory 822, a network interface 823, and a wireless communication interface 825.

The controller 821 may be, for example, a CPU or a DSP and operates various functions of upper layers of the base station device 820. For example, the controller 821 generates a data packet from data in a signal processed by the wireless communication interface 825 and transfers the generated packet via the network interface 823. The controller 821 may generate a bundled packet by bundling data from a plurality of baseband processors and transfer the generated bundled packet. Further, the controller 821 may have a logical function that executes control such as radio resource control, radio bearer control, mobility management, admission control, or scheduling. Further, the control may be executed in cooperation with a peripheral eNB or core network node. The memory 822 includes a RAM and a ROM, and stores a program executed by the controller 821 and a variety of control data (for example, a terminal list, transmitted power data, and scheduling data).

The network interface 823 is a communication interface for connecting the base station device 820 to a core network 824. The controller 821 may communicate with the core network node or other eNB via the network interface 823. In that case, the eNB 800 and the core network node or other eNB may be connected to each other by a logical interface (for example, an S1 interface or an X2 interface). The network interface 823 may be a wired communication interface or a wireless communication interface for a wireless backhaul. When the network interface 823 is a wireless communication interface, the network interface 823 may use a higher frequency band than a frequency band used by the wireless communication interface 825 for wireless communication.

The wireless communication interface 825 supports a cellular communication system such as Long Term Evolution (LTE) or LTE-Advanced, and provides wireless connection to a terminal located in the cell of the eNB 800 via the antenna 810. The wireless communication interface 825 can typically include a baseband (BB) processor 826 and an RF circuit 827. The BB processor 826 may perform, for example, encoding/decoding, modulation/demodulation, and multiplexing/demultiplexing, and executes various signal processing of each layer (for example, L1, Medium Access Control (MAC), Radio Link Control (RLC), and Packet Data Convergence Protocol (PDCP)). The BB processor 826 may have some or all of the above-mentioned logical functions instead of the controller 821. The BB processor 826 may be a module including a memory for storing a communication control program, a processor for executing the program, and related circuits, and the functions of the BB processor 826 may be changed by updating the above program. Further, the module may be a card or a blade inserted into a slot of the base station device 820, or may be a chip mounted on the card or the blade. On the other hand, the RF circuit 827 may include a mixer, a filter, and an amplifier, and transmits and receives radio signals via the antenna 810.

The wireless communication interface 825 includes a plurality of BB processors 826 as illustrated in FIG. 21, and the plurality of BB processors 826 may correspond to a plurality of frequency bands used by the eNB 800, for example. Further, the wireless communication interface 825 includes a plurality of RF circuits 827 as illustrated in FIG. 21, and the plurality of RF circuits 827 may correspond to, for example, a plurality of antenna elements. Although FIG. 21 illustrates an example in which the wireless communication interface 825 includes the plurality of BB processors 826 and the plurality of RF circuits 827, the wireless communication interface 825 may include a single BB processor 826 or a single RF circuit 827.

In the eNB 800 illustrated in FIG. 21, one or more components (the notification unit 141 and the communication control unit 143 or the communication control unit 241, and/or the notification unit 331) included in the control unit 140 described with reference to FIG. 4 or the control unit 240 described with reference to FIG. 5, and the control unit 330 described with reference to FIG. 6 may be mounted in the wireless communication interface 825. Alternatively, at least some of these components may be mounted in the controller 821. As an example, the eNB 800 may be equipped with a module including a part (for example, the BB processor 826) or all of the wireless communication interface 825 and/or the controller 821, and one or more of the above components may be mounted in the module. In this case, the module may store a program for causing the processor to function as one or more of the above components (in other words, a program for causing the processor to execute the operations of one or more of the above components), and may execute the program. As another example, the program for causing the processor to function as one or more of the above components may be installed in the eNB 800, and the wireless communication interface 825 (for example, the BB processor 826) and/or the controller 821 may execute the program. As described above, the eNB 800, the base station device 820, or the module may be provided as a device including one or more of the above components, and the program for causing the processor to function as one or more of the above components may be provided. Further, a readable recording medium on which the above program has been recorded may be provided.

Further, in the eNB 800 illustrated in FIG. 21, the wireless communication unit 120 described with reference to FIG. 4 or the wireless communication unit 220 described with reference to FIG. 5, and the communication unit 310 described with reference to FIG. 6 may be mounted in the wireless communication interface 825 (for example, the RF circuit 827). Further, the antenna unit 110 or the antenna unit 210 may be mounted on the antenna 810. Further, the storage unit 130 or the storage unit 230 and the storage unit 320 may be mounted in the memory 822.

(Second Application Example)

Figure 22:
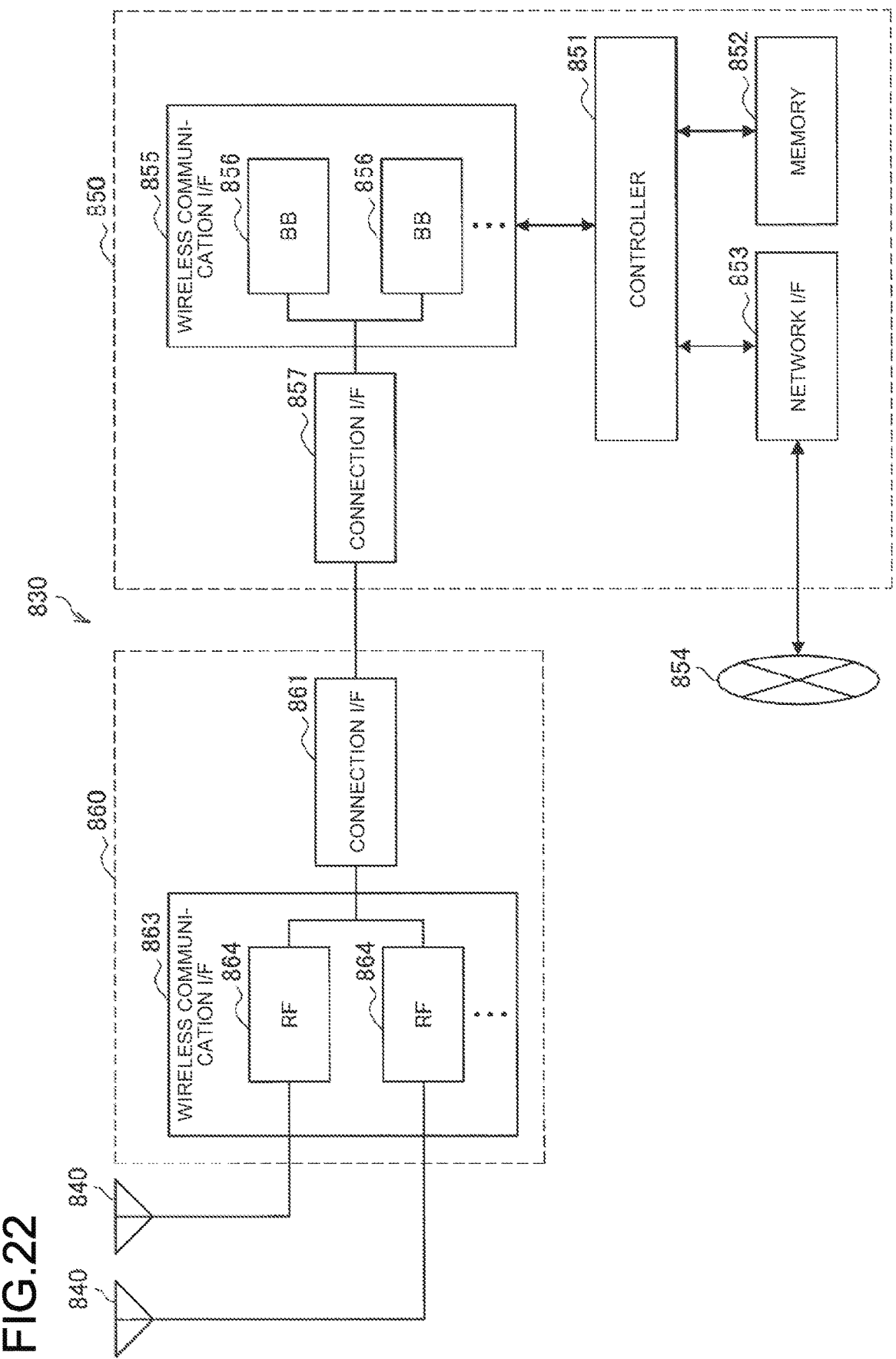
FIG. 22 is a block diagram illustrating a second example of a schematic configuration of an eNB.

FIG. 22 is a block diagram illustrating a second example of a schematic configuration of an eNB to which the technology according to the present disclosure can be applied. An eNB 830 has one or more antennas 840, a base station device 850, and an RRH 860. Each antenna 840 and the RRH 860 can be connected to each other via an RF cable. Further, the base station device 850 and the RRH 860 can be connected to each other by a high-speed line such as an optical fiber cable.

Each of the antennas 840 has one or more antenna elements (for example, a plurality of antenna elements forming a MIMO antenna) and is used for transmission and reception of radio signals by the RRH 860. The eNB 830 has a plurality of antennas 840 as illustrated in FIG. 22, and the plurality of antennas 840 may correspond to a plurality of frequency bands used by the eNB 830, for example. Although FIG. 22 illustrates an example in which the eNB 830 has the plurality of antennas 840, the eNB 830 may have a single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 21.

The wireless communication interface 855 supports a cellular communication system such as LTE or LTE-Advanced, and provides wireless connection to terminals located in a sector corresponding to the RRH 860 via the RRH 860 and the antenna 840. The wireless communication interface 855 can typically include a BB processor 856 and the like. The BB processor 856 is similar to the BB processor 826 described with reference to FIG. 21, except that it is connected to an RF circuit 864 of the RRH 860 via the connection interface 857. The wireless communication interface 855 includes a plurality of BB processors 856 as illustrated in FIG. 22, and the plurality of BB processors 856 may correspond to a plurality of frequency bands used by the eNB 830, for example. Although FIG. 22 illustrates an example in which the wireless communication interface 855 includes the plurality of BB processors 856, the wireless communication interface 855 may include a single BB processor 856.

The connection interface 857 is an interface for connecting the base station device 850 (wireless communication interface 855) to the RRH 860. The connection interface 857 may be a communication module for communication on the high-speed line that connects the base station device 850 (wireless communication interface 855) and the RRH 860.

The RRH 860 further includes a connection interface 861 and a wireless communication interface 863.

The connection interface 861 is an interface for connecting the RRH 860 (wireless communication interface 863) to the base station device 850. The connection interface 861 may be a communication module for communication on the high-speed line.

The wireless communication interface 863 transmits and receives radio signals via the antenna 840. The wireless communication interface 863 can typically include an RF circuit 864 and the like. The RF circuit 864 may include a mixer, a filter, and an amplifier, and transmits and receives radio signals via the antenna 840. The wireless communication interface 863 includes a plurality of RF circuits 864 as illustrated in FIG. 22, and the plurality of RF circuits 864 may correspond to, for example, a plurality of antenna elements. Although FIG. 22 illustrates an example in which the wireless communication interface 863 includes the plurality of RF circuits 864, the wireless communication interface 863 may include a single RF circuit 864.

In the eNB 830 illustrated in FIG. 22, one or more components (the notification unit 141 and the communication control unit 143 or the communication control unit 241, and/or the notification unit 331) included in the control unit 140 described with reference to FIG. 4 or the control unit 240 described with reference to FIG. 5, and the control unit 330 described with reference to FIG. 6 may be mounted in the wireless communication interface 855 and/or the wireless communication interface 863. Alternatively, at least some of these components may be mounted in the controller 851. As an example, the eNB 830 may be equipped with a module including a part (for example, the BB processor 856) or all of the wireless communication interface 855 and/or the controller 851, and one or more of the above components may be mounted in the module. In this case, the module may store a program for causing the processor to function as one or more of the above components (in other words, a program for causing the processor to execute the operations of one or more of the above components), and may execute the program. As another example, the program for causing the processor to function as one or more of the above components may be installed in the eNB 830, and the wireless communication interface 855 (for example, the BB processor 856) and/or the controller 851 may execute the program. As described above, the eNB 830, the base station device 850, or the module may be provided as a device including one or more of the above components, and the program for causing the processor to function as one or more of the above components may be provided. Further, a readable recording medium on which the above program has been recorded may be provided.

Further, in the eNB 830 illustrated in FIG. 22, for example, the wireless communication unit 120 described with reference to FIG. 4 or the wireless communication unit 220 described with reference to FIG. 5, and the communication unit 310 described with reference to FIG. 6 may be mounted in the wireless communication interface 863 (for example, the RF circuit 864). Further, the antenna unit 110 or the antenna unit 210 may be mounted on the antenna 840. Further, the storage unit 130 or the storage unit 230 and the storage unit 320 may be mounted in the memory 852.

<4.3. Application Example Related to Terminal Device>
(First Application Example)

Figure 23:
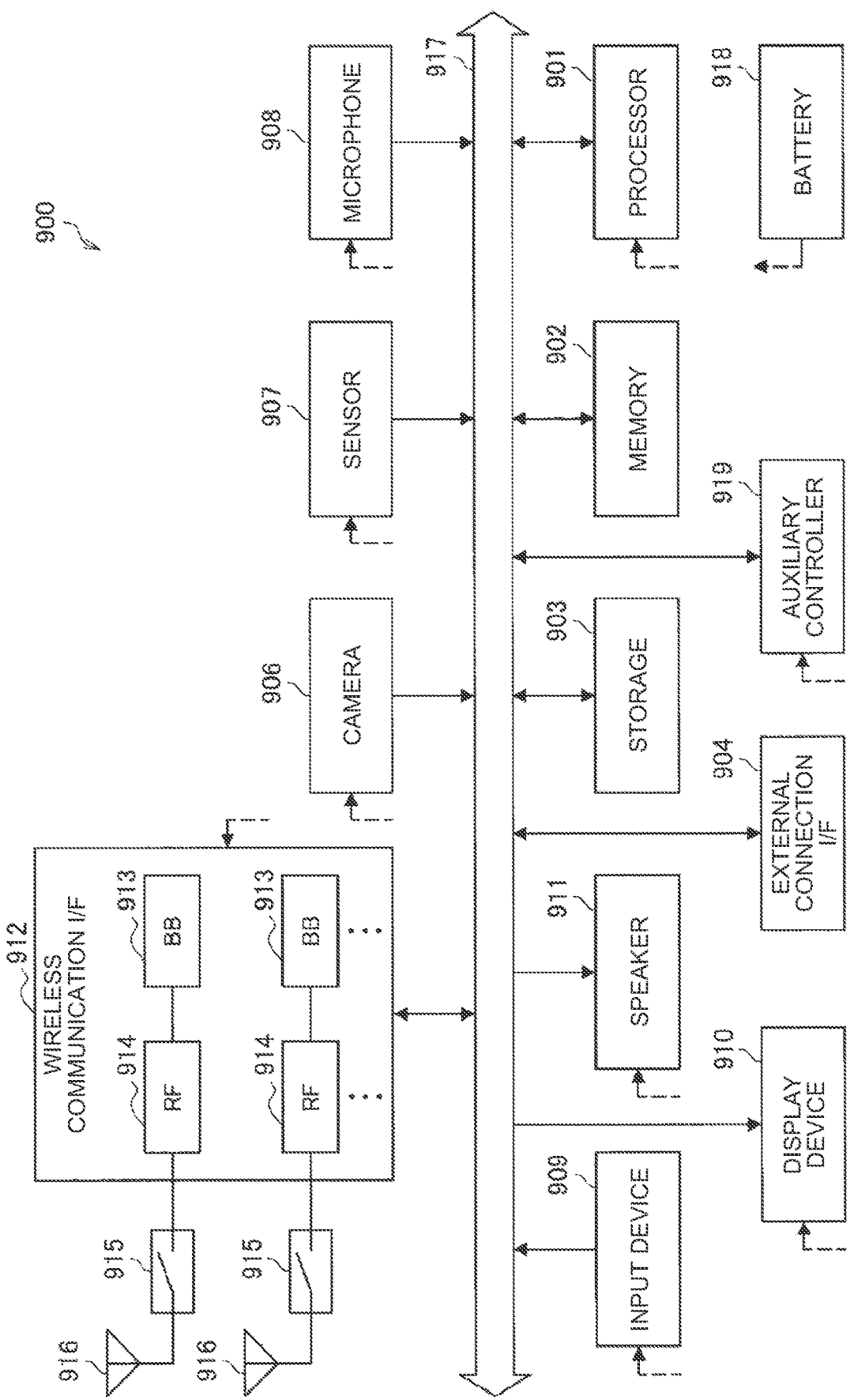
FIG. 23 is a block diagram illustrating an example of a schematic configuration of a smartphone.

FIG. 23 is a block diagram illustrating an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a System on Chip (SoC), and controls functions of an application layer and other layers of the smartphone 900. The memory 902 includes a RAM and a ROM and stores programs and data executed by the processor 901. The storage 903 can include a storage medium such as a semiconductor memory or a hard disk. The external connection interface 904 is an interface for connecting an external device such as a memory card or a universal serial bus (USB) device to the smartphone 900.

The camera 906 has an imaging element such as a charge coupled device (CCD) or a complementary metal oxide semiconductor (CMOS), and generates an imaging image. The sensor 907 can include, for example, a group of sensors such as a positioning sensor, a gyro sensor, a geomagnetic sensor, and an acceleration sensor. The microphone 908 converts a voice input to the smartphone 900 into a voice signal. The input device 909 includes, for example, a touch sensor that detects a touch on a screen of the display device 910, a keypad, a keyboard, a button, or a switch, and receives an operation or information input from a user. The display device 910 has a screen such as a liquid crystal display (LCD) or an organic light emitting diode (OLED) display, and displays an output image of the smartphone 900. The speaker 911 converts the voice signal output from the smartphone 900 into a voice.

The wireless communication interface 912 supports a cellular communication system such as LTE or LTE-Advanced and performs wireless communication. The wireless communication interface 912 can typically include a BB processor 913 and an RF circuit 914. The BB processor 913 may perform, for example, encoding/decoding, modulation/demodulation, and multiplexing/demultiplexing, and executes various signal processing for wireless communication. On the other hand, the RF circuit 914 may include a mixer, a filter, and an amplifier, and transmits and receives radio signals via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 23. Although FIG. 23 illustrates an example in which the wireless communication interface 912 includes the plurality of BB processors 913 and the plurality of RF circuits 914, the wireless communication interface 912 may include a single BB processor 913 or a single RF circuit 914.

Further, the wireless communication interface 912 may support other types of wireless communication systems such as a short-range wireless communication system, a near-field wireless communication system, or a wireless local area network (LAN) system, in addition to the cellular communication system. In that case, the wireless communication interface 912 may include the BB processor 913 and the RF circuit 914 for each wireless communication system.

Each of the antenna switches 915 switches the connection destination of the antenna 916 between a plurality of circuits included in the wireless communication interface 912 (for example, circuits for different wireless communication systems).

Each of the antennas 916 has one or more antenna elements (for example, a plurality of antenna elements forming a MIMO antenna) and is used for transmission and reception of radio signals by the wireless communication interface 912. The smartphone 900 may have a plurality of antennas 916 as illustrated in FIG. 23. Although FIG. 23 illustrates an example in which the smartphone 900 has the plurality of antennas 916, the smartphone 900 may have a single antenna 916.

Further, the smartphone 900 may include the antenna 916 for each wireless communication system. In that case, the antenna switch 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to each block of the smartphone 900 illustrated in FIG. 23 via a feed line partially illustrated by a broken line in the drawing. The auxiliary controller 919 operates minimum necessary functions of the smartphone 900, for example, in a sleep mode.

In the smartphone 900 illustrated in FIG. 23, one or more components (the notification unit 141 and the communication control unit 143 or the communication control unit 241, and/or the notification unit 331) included in the control unit 140 described with reference to FIG. 4 or the control unit 240 described with reference to FIG. 5, and the control unit 330 described with reference to FIG. 6 may be mounted in the wireless communication interface 912. Alternatively, at least some of these components may be mounted in the processor 901 or the auxiliary controller 919. As an example, the smartphone 900 may be equipped with a module including a part (for example, the BB processor 913) or all of the wireless communication interface 912, the processor 901, and/or the auxiliary controller 919, and one or more of the above components may be mounted in the module. In this case, the module may store a program for causing the processor to function as one or more of the above components (in other words, a program for causing the processor to execute the operations of one or more of the above components), and may execute the program. As another example, the program for causing the processor to function as one or more of the above components may be installed in the smartphone 900, and the wireless communication interface 912 (for example, the BB processor 913), the processor 901, and/or the auxiliary controller 919 may execute the program. As described above, the smartphone 900 or the module may be provided as a device including one or more of the above components, and the program for causing the processor to function as one or more of the above components may be provided. Further, a readable recording medium on which the above program has been recorded may be provided.

Further, in the smartphone 900 illustrated in FIG. 23, for example, the wireless communication unit 120 described with reference to FIG. 4 or the wireless communication unit 220 described with reference to FIG. 5, and the communication unit 310 described with reference to FIG. 6 may be mounted in the wireless communication interface 912 (for example, the RF circuit 914). Further, the antenna unit 110 or the antenna unit 210 may be mounted on the antenna 916. Further, the storage unit 130 or the storage unit 230 and the storage unit 320 may be mounted in the memory 902.

(Second Application Example)

Figure 24:
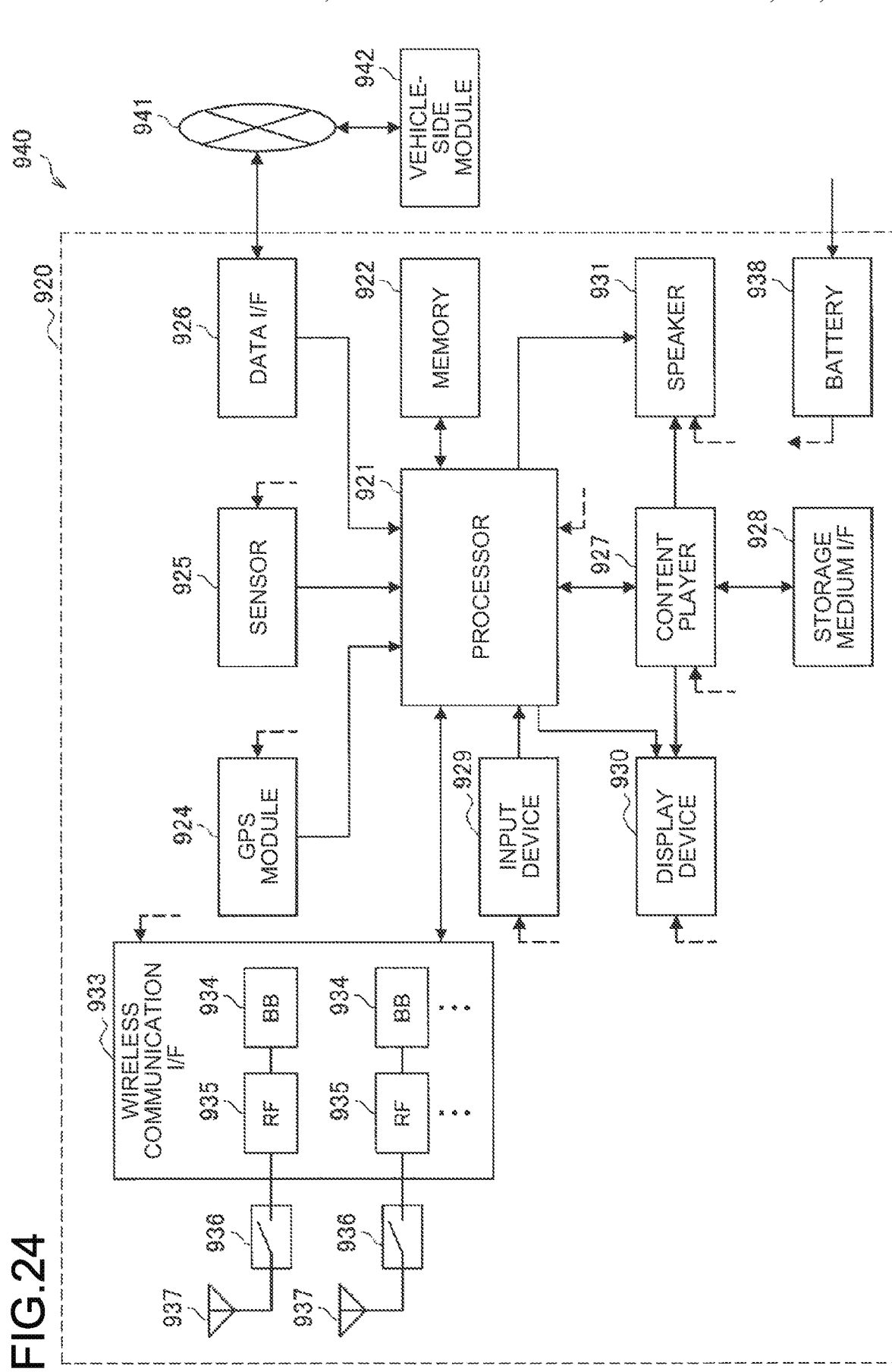
FIG. 24 is a block diagram illustrating an example of a schematic configuration of a car navigation device.

FIG. 24 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or SoC, and controls a navigation function and other functions of the car navigation device 920. The memory 922 includes a RAM and a ROM and stores programs and data executed by the processor 921.

The GPS module 924 uses GPS signals received from GPS satellites to measure a position (for example, the latitude, the longitude, and the altitude) of the car navigation device 920. The sensor 925 can include, for example, a group of sensors such as a gyro sensor, a geomagnetic sensor, and a barometric pressure sensor. The data interface 926 is connected to an in-vehicle network 941 via a terminal (not illustrated), and acquires data generated on the vehicle side such as vehicle speed data.

The content player 927 plays contents stored in a storage medium (for example, a CD or a DVD) inserted into the storage medium interface 928. The input device 929 includes, for example, a touch sensor that detects a touch on the screen of the display device 930, a button, or a switch, and receives an operation or information input from the user. The display device 930 has a screen such as an LCD or OLED display and displays an image of a navigation function or contents to be played. The speaker 931 outputs a voice of the navigation function or the contents to be played.

The wireless communication interface 933 supports a cellular communication system such as LTE or LTE-Advanced and performs wireless communication. The wireless communication interface 933 can typically include a BB processor 934 and an RF circuit 935. The BB processor 934 may perform, for example, encoding/decoding, modulation/demodulation, and multiplexing/demultiplexing, and executes various signal processing for wireless communication. On the other hand, the RF circuit 935 may include a mixer, a filter, and an amplifier, and transmits and receives radio signals via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 24. Although FIG. 24 illustrates an example in which the wireless communication interface 933 includes the plurality of BB processors 934 and the plurality of RF circuits 935, the wireless communication interface 933 may include a single BB processor 934 or a single RF circuit 935.

Further, the wireless communication interface 933 may support other types of wireless communication systems such as a short-range wireless communication system, a near-field wireless communication system, or a wireless LAN system, in addition to the cellular communication system. In that case, the wireless communication interface 933 may include the BB processor 934 and the RF circuit 935 for each wireless communication system.

Each of the antenna switches 936 switches the connection destination of the antenna 937 between a plurality of circuits included in the wireless communication interface 933 (for example, circuits for different wireless communication systems).

Each of the antennas 937 has one or more antenna elements (for example, a plurality of antenna elements forming a MIMO antenna) and is used for transmission and reception of radio signals by the wireless communication interface 933. The car navigation device 920 may have a plurality of antennas 937 as illustrated in FIG. 24. Although FIG. 24 illustrates an example in which the car navigation device 920 has the plurality of antennas 937, the car navigation device 920 may have a single antenna 937.

Further, the car navigation device 920 may include the antenna 937 for each wireless communication system. In that case, the antenna switch 936 may be omitted from the configuration of the car navigation device 920.

The battery 938 supplies power to each block of the car navigation device 920 illustrated in FIG. 24 via a feed line partially illustrated by a broken line in the drawing. Further, the battery 938 stores power supplied from the vehicle side.

In the car navigation device 920 illustrated in FIG. 24, one or more components (the notification unit 141 and the communication control unit 143 or the communication control unit 241, and/or the notification unit 331) included in the control unit 140 described with reference to FIG. 4 or the control unit 240 described with reference to FIG. 5, and the control unit 330 described with reference to FIG. 6 may be mounted in the wireless communication interface 933. Alternatively, at least some of these components may be mounted in the processor 921. As an example, the car navigation device 920 may be equipped with a module including a part (for example, the BB processor 934) or all of the wireless communication interface 933 and/or the processor 921, and one or more of the above components may be mounted in the module. In this case, the module may store a program for causing the processor to function as one or more of the above components (in other words, a program for causing the processor to execute the operations of one or more of the above components), and may execute the program. As another example, the program for causing the processor to function as one or more of the above components may be installed in the car navigation device 920, and the wireless communication interface 933 (for example, the BB processor 934) and/or the processor 921 may execute the program. As described above, the car navigation device 920 or the module may be provided as a device including one or more of the above components, and the program for causing the processor to function as one or more of the above components may be provided. Further, a readable recording medium on which the above program has been recorded may be provided.

Further, in the car navigation device 920 illustrated in FIG. 24, for example, the wireless communication unit 120 described with reference to FIG. 4 or the wireless communication unit 220 described with reference to FIG. 5 and the communication unit 310 described with reference to FIG. 6 may be mounted in the wireless communication interface 933 (for example, the RF circuit 935). Further, the antenna unit 110 or the antenna unit 210 may be mounted on the antenna 937. Further, the storage unit 130 or the storage unit 230 and the storage unit 320 may be mounted in the memory 922.

Further, the technology according to the present disclosure may be realized as an in-vehicle system (or a vehicle) 940 including one or more blocks of the car navigation device 920 described above, the in-vehicle network 941, and a vehicle-side module 942. The vehicle-side module 942 generates vehicle-side data such as a vehicle speed, an engine speed, or failure information, and outputs the generated data to the in-vehicle network 941.

<<5. Conclusion>>

As described above, one embodiment of the present disclosure has been described in detail with reference to FIGS. 1 to 24. As described above, the first communication device 100 according to the present embodiment switches whether or not to transmit the first reference signal using the scheduled resource scheduled to be used to transmit the first reference signal. As an example, the first communication device 100 does not transmit the first reference signal when transmission equalization or reception equalization based on the channel information acquired in advance is possible, and transmits the first reference signal otherwise. As a result, the transmission of the reference signal, which is not always necessary for decoding the transmission signal, is omitted, so that transmission efficiency of the entire system can be further improved.

The preferred embodiments of the present disclosure have been described in detail with reference to the accompanying drawings, but the technical scope of the present disclosure is not limited to such examples. It is obvious that a person with an ordinary skill in a technological field of the present disclosure could conceive of various alterations or corrections within the scope of the technical ideas described in the appended claims, and it should be understood that such alterations or corrections will naturally belong to the technical scope of the present disclosure.

For example, in the above embodiment, the switching processing of the reference signal transmitted on the downlink or the sidelink has been described in FIGS. 7 to 19, but the present technology is not limited to such examples. The switching processing described for the reference signal transmitted on the downlink can be similarly applied to the switching of the reference signal transmitted on the uplink or the sidelink. Further, the switching processing described for the reference signal transmitted on the uplink can be similarly applied to the switching of the reference signal transmitted on the downlink or the sidelink.

Further, the processing described using the flowchart and the sequence diagram in the present specification does not necessarily have to be executed in the order illustrated. Some processing steps may be executed in parallel. Further, additional processing steps may be adopted, and some processing steps may be omitted.

Furthermore, the effects described in the present specification are merely illustrative or exemplary and are not restrictive. That is, the technology according to the present disclosure can exhibit other effects obvious to those skilled in the art from the description of the present specification in addition to or in place of the above effects.

Note that the following configurations also belong to the technical scope of the present disclosure.

(1)
A communication device comprising:
a control unit that switches whether or not to transmit a first reference signal using a scheduled resource scheduled to be used to transmit a reference signal.

(2)
The communication device according to (1), wherein the control unit switches whether or not to transmit the first reference signal using the scheduled resource, on the basis of channel information acquired in advance.

(3)
The communication device according to (2), wherein the control unit switches whether or not to transmit the first reference signal using the scheduled resource, on the basis of an elapsed time from receiving a second reference signal from a communication partner.

(4)
The communication device according to (3), wherein the control unit switches whether or not to include the first reference signal in a reception response of a signal including the second reference signal, on the basis of an elapsed time until the reception response is transmitted.

(5)
The communication device according to any one of (2) to (4), wherein the control unit switches whether or not to transmit the first reference signal using the scheduled resource, on the basis of the number of symbols included in a slot.

(6)
The communication device according to any one of (2) to (5), wherein the control unit switches whether or not to transmit the first reference signal using the scheduled resource, on the basis of whether or not a predetermined timer has expired or whether or not a time is within a predetermined time interval.

(7)
The communication device according to any one of (2) to (6), wherein the control unit switches whether or not to transmit the first reference signal using the scheduled resource, on the basis of the number of repeated transmissions.

(8)
The communication device according to any one of (2) to (7), wherein the control unit switches whether or not to transmit the first reference signal using the scheduled resource, on the basis of a duplex system.

(9)
The communication device according to any one of (2) to (8), wherein the control unit switches whether or not to transmit the first reference signal using the scheduled resource, on the basis of whether or not a beam correspondence is held.

(10)
The communication device according to any one of (2) to (9), wherein, when the first reference signal is not transmitted using the scheduled resource, the control unit performs transmission equalization on the basis of the channel information.

(11)
The communication device according to any one of (1) to (10), wherein the control unit switches whether or not to transmit the first reference signal using the scheduled resource, on the basis of at least one of information indicating whether or not to transmit the first reference signal using the scheduled resource, information indicating types of channels instructed not to be used to transmit the first reference signal, and identification information of the scheduled resource instructed not to be used to transmit the first reference signal.

(12)

The communication device according to any one of (1) to (10), wherein the control unit switches whether or not to transmit the first reference signal using the scheduled resource, on the basis of information indicating a criterion for switching whether or not to transmit the first reference signal using the scheduled resource.

(13)

The communication device according to any one of (1) to (12), wherein the control unit transmits capability information regarding switching whether or not to transmit the first reference signal using the scheduled resource.

(14)

The communication device according to any one of (1) to (13), wherein
transmission of the first reference signal using the scheduled resource is not performed in communication in a first direction, and transmission of a second reference signal using the scheduled resource is performed in communication in a second direction facing the first direction, and
the first direction and the second direction are a downlink and an uplink, an uplink and a downlink, or a sidelink and a sidelink, respectively.

(15)

The communication device according to any one of (1) to (14), wherein
transmission of the first reference signal using the scheduled resource in resources for a first use is not performed, and transmission of a second reference signal using the scheduled resource in resources for a second use different from the first use is performed, and
the resources for the first use and the resources for the second use are resources for control and resources for data, or resources for data and resources for control, respectively.

(16)

A communication device comprising:
a control unit that performs reception processing according to whether or not a first reference signal has been transmitted using a scheduled resource scheduled to be used to transmit a reference signal.

(17)

A communication method comprising:
switching, by a processor, whether or not to transmit a first reference signal using a scheduled resource scheduled to be used to transmit a reference signal.

(18)

A communication method comprising:
performing, by a processor, reception processing according to whether or not a first reference signal has been transmitted using a scheduled resource scheduled to be used to transmit a reference signal.

(19)

A recording medium having a program recorded therein, the program causing a computer to function as:
a control unit that switches whether or not to transmit a first reference signal using a scheduled resource scheduled to be used to transmit a reference signal.

(20)

A recording medium having a program recorded therein, the program causing a computer to function as:
a control unit that performs reception processing according to whether or not a first reference signal has been transmitted using a scheduled resource scheduled to be used to transmit a reference signal.

REFERENCE SIGNS LIST

1 COMMUNICATION SYSTEM
10 BASE STATION
20 TERMINAL DEVICE
30 CORE NETWORK
40 PDN
100 FIRST COMMUNICATION DEVICE
110 ANTENNA UNIT
120 WIRELESS COMMUNICATION UNIT
130 STORAGE UNIT
140 CONTROL UNIT
141 NOTIFICATION UNIT
143 COMMUNICATION CONTROL UNIT
200 SECOND COMMUNICATION DEVICE
210 ANTENNA UNIT
220 WIRELESS COMMUNICATION UNIT
230 STORAGE UNIT
240 CONTROL UNIT
241 COMMUNICATION CONTROL UNIT
300 COMMUNICATION CONTROL DEVICE
310 COMMUNICATION UNIT
320 STORAGE UNIT
330 CONTROL UNIT
331 NOTIFICATION UNIT

The invention claimed is:

1. A communication device, comprising:
a control unit configured to:
switch between transmission and non-transmission of a first reference signal by use of a scheduled resource, wherein
the switch between the transmission and the non-transmission of the first reference signal is based on
channel information acquired in advance, and
an elapsed time from reception of a second reference signal from a communication partner, and
the scheduled resource is scheduled to be used to transmit the first reference signal; and
switch between inclusion and non-inclusion of the first reference signal in a reception response of a signal including the second reference signal, based on an elapsed time until the reception response is transmitted.

2. The communication device according to claim 1, wherein the control unit is further configured to switch between the transmission and the non-transmission of the first reference signal based on a number of symbols included in a slot.

3. The communication device according to claim 1, wherein
the switch between the transmission and the non-transmission of the first reference signal is based on one of expiration of a specific timer or a time that is within or outside a specific time interval.

4. The communication device according to claim 1, wherein the control unit is further configured to switch between the transmission and the non-transmission of the first reference signal based on a number of repeated transmissions.

5. The communication device according to claim 1, wherein the control unit is further configured to switch between the transmission and the non-transmission of the first reference signal based on a duplex system.

6. The communication device according to claim 1, wherein the control unit is further configured to switch between the transmission and the non-transmission of the first reference signal based on a beam correspondence is held or released.

7. The communication device according to claim 1, wherein, based on non-transmission of the first reference signal, the control unit is further configured to perform transmission equalization based on the channel information.

8. The communication device according to claim 1, wherein the control unit is further configured to switch between the transmission and the non-transmission of the first reference signal based on at least one of:
information indicating the transmission or the non-transmission of the first reference signal,
information indicating types of channels instructed to be used for the non-transmission of the first reference signal, and
identification information of the scheduled resource instructed to be used for the non- transmission of the first reference signal.

9. The communication device according to claim 1, wherein the control unit is further configured to switch between the transmission and the non-transmission of the first reference signal based on information indicating a criterion to switch between the transmission and the non-transmission of the first reference signal.

10. The communication device according to claim 1, wherein the control unit is further configured to transmit capability information regarding the switch between the transmission and the non-transmission of the first reference signal.

11. The communication device according to claim 1, wherein
communication in a first direction corresponds to the non-transmission of the first reference signal,
communication in a second direction corresponds to transmission of the second reference signal,
the second direction faces the first direction, and
the first direction and the second direction are one of a downlink and an uplink, an uplink and a downlink, or a sidelink and a sidelink, respectively.

12. The communication device according to claim 1, wherein
a first plurality of resources for a first use corresponds to the non-transmission of the first reference signal,
a second plurality of resources for second use corresponds to transmission of the second reference signal,
the second use is different from the first use, and
the first plurality of resources for the first use and the second plurality of resources for the second use are one of resources for control and resources for data, or resources for data and resources for control, respectively.

13. A communication device, comprising:
a control unit configured to perform reception processing based on transmission of a first reference signal from a communication partner by use of a scheduled resource, wherein
the scheduled resource is scheduled to be used to transmit the first reference signal,
the communication partner switches between the transmission and non-transmission of the first reference signal based on
channel information acquired in advance, and
an elapsed time from reception of a second reference signal from the communication device, and
the communication partner switches between inclusion and non-inclusion of the first reference signal in a reception response of a signal including the second reference signal, based on an elapsed time until the reception response is transmitted.

14. A communication method, comprising:
switching, by a processor, between transmission and non-transmission of a first reference signal by use of a scheduled resource, wherein
the switch between the transmission and the non-transmission of the first reference signal is based on channel information acquired in advance, and
an elapsed time from reception of a second reference signal from a communication partner, and
the scheduled resource is scheduled to be used to transmit the first reference signal; and
switching, by the processor, between inclusion and non-inclusion of the first reference signal in a reception response of a signal including the second reference signal, based on an elapsed time until the reception response is transmitted.

15. A communication method, comprising:
performing, by a processor of a communication device, reception processing based on transmission of a first reference signal from a communication partner by use of a scheduled resource, wherein
the scheduled resource is scheduled to be used to transmit the first reference signal,
the communication partner switches between the transmission and non-transmission of the first reference signal based on
channel information acquired in advance, and
an elapsed time from reception of a second reference signal from the communication device, and
the communication partner switches between inclusion and non-inclusion of the first reference signal in a reception response of a signal including the second reference signal, based on an elapsed time until the reception response is transmitted.

16. A non-transitory computer-readable medium having stored thereon computer-executable instructions, which when executed by a processor, causes the processor to execute operations, the operations comprising:
switching between transmission and non-transmission of a first reference signal by use of a scheduled resource, wherein
the switch between the transmission and the non-transmission of the first reference signal is based on channel information acquired in advance, and
an elapsed time from reception of a second reference signal from a communication partner, and
the scheduled resource is scheduled to be used to transmit the first reference signal; and
switching between inclusion and non-inclusion of the first reference signal in a reception response of a signal including the second reference signal, based on an elapsed time until the reception response is transmitted.

17. A non-transitory computer-readable medium having stored thereon computer-executable instructions, which when executed by a processor, causes the processor to execute operations, the operations comprising:
performing reception processing based on transmission of a first reference signal from a communication partner by use of a scheduled resource, wherein the scheduled resource is scheduled to be used to transmit the first reference signal, the communication partner switches between the transmission and non-transmission of the first reference signal based on
channel information acquired in advance, and
an elapsed time from reception of a second reference signal, and the communication partner switches between inclusion and non-inclusion of the first reference signal in a reception response of a signal including the second reference signal, based on an elapsed time until the reception response is transmitted.

* * * * *